US006414635B1

(12) United States Patent
Stewart et al.

(10) Patent No.: US 6,414,635 B1
(45) Date of Patent: Jul. 2, 2002

(54) GEOGRAPHIC-BASED COMMUNICATION SERVICE SYSTEM WITH MORE PRECISE DETERMINATION OF A USER'S KNOWN GEOGRAPHIC LOCATION

(75) Inventors: Brett B. Stewart; James W. Thompson, both of Austin, TX (US)

(73) Assignee: Wayport, Inc., Austin, TX (US)

( * ) Notice: Subject to any disclaimer, the term of this patent is extended or adjusted under 35 U.S.C. 154(b) by 0 days.

(21) Appl. No.: 09/694,747

(22) Filed: Oct. 23, 2000

(51) Int. Cl.[7] .................................................. G01S 3/02
(52) U.S. Cl. ........................................ 342/457; 342/463
(58) Field of Search ...................... 342/357.01, 357.07, 342/450, 457, 357.08

(56) References Cited

U.S. PATENT DOCUMENTS

| | | |
|---|---|---|
| 4,845,504 A | 7/1989 | Robert et al. |
| 5,095,532 A | 3/1992 | Mardus |
| 5,185,857 A | 2/1993 | Rozmanith et al. |
| 5,218,367 A * | 6/1993 | Sheffer et al. ............... 342/457 |
| 5,223,844 A | 6/1993 | Mansell et al. |
| 5,243,652 A | 9/1993 | Teare et al. |
| 5,327,144 A | 7/1994 | Stilp et al. |
| 5,365,516 A | 11/1994 | Jandrell |
| 5,432,841 A | 7/1995 | Rimer |
| 5,487,103 A | 1/1996 | Richardson et al. |
| 5,504,482 A | 4/1996 | Schreder |
| 5,511,233 A | 4/1996 | Otten |
| 5,559,520 A | 9/1996 | Barzegar et al. |
| 5,627,549 A | 5/1997 | Park |
| 5,636,245 A | 6/1997 | Ernst et al. |

(List continued on next page.)

OTHER PUBLICATIONS

Bill N. Schilit and Marvin M. Theimer, Disseminating Active Map Information Mobile Hosts, IEEE Network, Sep./Oct. 1994.

Andy Harter and Andy Hopper, A Distributed Location System for the Active Office, IEEE Network, Jan./Feb. 1994.

(List continued on next page.)

Primary Examiner—Dao Phan
(74) Attorney, Agent, or Firm—Conley, Rose & Tayon PC; Jeffrey C. Hood

(57) ABSTRACT

A geographic based communications service system that includes a network and a plurality of access points connected to the network and arranged at known locations in a geographic region. One or more service providers or information providers may be connected to the network to provide services or information on the network. Content provided by the service providers may be based on the known geographic location of the user of a portable computing device (PCD). The known geographic location may be determined with a high degree of precision, using one or more access points and one of several different techniques. In one embodiment, the geographic location of the PCD may be determined within a radius of ten feet. Access points may be configured to determine the bearing of a signal received from a PCD, as well as the strength of the signal transmitted by the PCD. Access points may also be configured to send and receive signals with time stamps. These time stamps may be used to calculate signal travel time, thereby allowing a determination of the distance between an access point and a PCD. Each access point may include location circuitry. The location circuitry may include both analog and digital circuitry configured to perform the various methods used to determine the precise geographic location.

109 Claims, 22 Drawing Sheets

U.S. PATENT DOCUMENTS

| | | | |
|---|---|---|---|
| 5,646,632 | A | 7/1997 | Khan et al. |
| 5,806,018 | A | 9/1998 | Smith et al. |
| 5,835,061 | A | 11/1998 | Stewart |
| 5,838,237 | A * | 11/1998 | Revell et al. ............... 340/573 |
| 5,892,454 | A * | 4/1999 | Schipper et al. ........ 340/825.37 |
| 5,952,959 | A * | 9/1999 | Norris ......................... 342/357 |
| 5,969,678 | A | 10/1999 | Stewart |
| 5,983,091 | A | 11/1999 | Rodriguez |
| 6,119,013 | A | 9/2000 | Maloney et al. |
| 6,249,252 | B1 | 6/2001 | Dupray |
| 6,259,405 | B1 | 7/2001 | Stewart et al. |
| 6,275,705 | B1 * | 8/2001 | Drane et al. ................ 455/456 |
| 6,311,060 | B1 | 10/2001 | Evans et al. |
| 6,314,281 | B1 | 11/2001 | Chao et al. |
| 6,317,604 | B1 | 11/2001 | Kovach, Jr. et al. |
| 6,326,918 | B1 | 12/2001 | Stewart |

OTHER PUBLICATIONS

Max J. Egenhofer, Spatial SQL: A Query and Presentation Language, IEEE Network, Feb. 1994.

Mike Spreitzer and Marvin Theimer, Providing Location Information in a Ubiquitous Computing Environment, Proceedings of the Fourteenth ACM Symposium on Operating Systems Principles, Dec. 1993.

George W. Fitzmaurice, Situated Information Spaces and Spatially Aware Palmtop Computers, Communication of the ACM, Jul. 1993.

Ronald Azuma, Tracking Requirements for Augmented Reality, Communications of the ACM, vol. 36. No. 7, Jul. 1993.

Roy Want et al., The Active Badge Location System, ACM Transactions on Information Systems, vol. 10, No. 1, Jan. 1992.

Marvin White, Emerging Requirements for Digital Maps for In–Vehicle Pathfinding and Other Traveller Assistance, Vehicular Navigation & Information Systems Conference Proceedings, Part I, Oct. 1991.

Fred Phail, The Power of a Personal Computer for Car Information and Communications Systems, Vehicular Navigation & Information Systems Conference Proceedings, Part I, Oct. 1991.

Thomas A Dingus et al., Human Factors Engineering the TravTek Driver Interface, Vehicular Navigation & Information Systems Conference Proceedings, Part II, Oct. 1991.

Michel Muffat et al., European Cooperation on Dual Mode Route Guidance Perspectives for Advanced Research Partners, Vehicular Navigation & Information Systems Conference Proceedings, Part II, Oct. 1991.

* cited by examiner

GEOGRAPHIC-BASED COMMUNICATION SERVICE SYSTEM WITH MORE PRECISE DETERMINATION OF A USER'S KNOWN GEOGRAPHIC LOCATION

BACKGROUND OF THE INVENTION

1. Field of the Invention

The invention generally relates to a geographic based communications service and, more particularly, is concerned with a system and method for determining the approximate location of mobile users of portable computing devices who are in the vicinity of wireless local area network access points.

2. Description of the Related Art

As technology improvements result in smaller, lighter and more portable computing devices (PCDs), a wide variety of new applications and users will emerge. Mobile users will not only operate such devices in stand alone mode, but will also desire the ability to send and receive information through such devices while at virtually any location. The need to communicate will arise in circumstances where hard-wired links may not be readily available or practical or when the mobile user cannot be reached immediately. Moreover, as a result of the user being mobile, the precise location of the PCD is often variable or not determined. As used herein, "MU" is an abbreviation for "mobile user of a portable computing device". Similarly, the plural, "MUs" is an abbreviation for "mobile users of portable computing devices".

Conventional communication systems for computing devices are not equipped to handle such communication scenarios. Commercially available PCDs are generally equipped with industry standard interface ports for driving a peripheral device such as a printer, a plotter, or a modem. While operating in an unknown, remote location not connected to a network, a MU may be unaware of messages waiting for him. In addition, conventionally, the MU may need to wait until reaching an office or other place with appropriate equipment to receive such messages and to transmit or print documents or other information prepared by the MU on his portable computing device.

By way of example and not limitation, one type of MU is the traveler who passes through airports or similar mass transit centers (e.g., subway commuters), uses ground transportation, and stays in a hotel. In a typical scenario, a traveler may use a portable computing device to perform calculations or prepare documents during an airplane flight. Simultaneously, associates may leave messages for the traveler on a network. In conventional systems, the traveler's work product and messages destined for the traveler are not available until the traveler arrives at a location where a wired connection to the traveler's network is available.

A further example of inefficiencies for the traveler concerns travel arrangements themselves. After arriving at an airport, the traveler proceeds to a car rental desk or to some other transportation location. The traveler typically waits in line while the car rental agency inquires about automobile preference, driver's license, method of payment, type of insurance required, etc. Having experienced some delay, the traveler is now on his way to a business location or hotel. Upon arriving at a hotel check-in/registration desk, the traveler often experiences further delay waiting in line and providing the check-in clerk with routine information such as address, length of stay, type of room desired, method of payment, etc. In addition, the traveler may need to call back to his office to check for voice-mail messages, thereby incurring further delays. While accessing databases for information about the traveler, where his preferences and requirements may reduce such delays, a common characteristic is that the pending arrival or presence of the traveler is not known to those who may act in advance. Further, conventional systems cannot generally locate a mobile user of a portable computing device and take advantage of that information to reduce the time required to complete routine activities or to provide the traveler options that may enhance the traveler's productivity.

In another example, when a user dials a telephone number to an automatic teller machine (ATM) locator, the user is prompted to key in his area code and exchange prefix. The locator system then identifies one or more ATMs within the user's area. However, the system requires the user to call in and cannot locate the user any more accurately than the telephone exchange area. Thus, the user may be advised of an ATM quite a physical distance from the user's location.

In addition, it is desirable to be able to provide information, such as advertising or other content, to a MU when the information is based on a location of the PCD within a geographic area. It is also desirable to provide information to a MU based on a geographic location of the PCD in combination with demographic information regarding the MU or past transactions of the MU. Information provided to an MU may also be further tailored to an approximate location of the PCD. For instance, using the ATM example above, a content provider may be able to direct a user of a PCD to the nearest ATM machine based on the precise location of the user.

U.S. Pat. No. 5,835,061 discloses a geographic-based communication service system which comprises a plurality of access points which are operable to communicate with PCD's of mobile users. The geographic location of the access point is known, and when an access point detects a PCD of a user, the access point can provide its geographic location, thus indicating the approximate location of the user. However, since the known geographic location of the access point is used as an indication of the location of the user, the access point or the communications network system can only detect the location of the user within the granularity of the range of the access point, i.e., the PCD of the user may be anywhere within the range of the access point. This may not provide sufficient granularity to provide certain geographic-based services to the user.

Therefore, a new geographic-based communication service is desired which can more precisely identify the geographic location of users.

SUMMARY OF THE INVENTION

In one embodiment, the present invention comprises a geographic based communications service system. The geographic-based communications service system includes a network and a plurality of access points connected to the network. The access points may be arranged at known locations in a geographic region. One or more service providers or information providers may be connected to the network to provide services or information on the network. As used herein, the term "service provider" is intended to include goods providers, information providers, and/or service providers.

A mobile user (MU) may use a portable computing device (PCD) to connect to the network and access information or services from the network. The PCD of the mobile user may connect to an access point in a wireless fashion. The PCD may optionally be configured to transmit identification information indicating the identity of the mobile user. Each of the plurality of access points may be configured to independently communicate with a PCD and may also be configured to receive the identification information indicating the identity of the user of the PCD.

When a PCD of a user is in proximity to a first access point and communicates with the first access point, the first access point may determine the geographic location of the PCD and transmit information regarding the geographic location of the PCD to one or more providers on the network. Thus, the first access point is operable to transmit the information regarding approximate geographic location of the PCD, not just the known geographic location of the first access point. This allows improved geographic-based services to be provided to the user.

In the preferred embodiment, one or more access points may include location circuitry. The location circuitry may be configured to perform one of various methods used to determine the geographic location of PCDs of users. Each access point having the location circuitry may thus be operable to detect the location of a user, (i.e., the PCD of a user), with a granularity greater than simply the known geographic location of the access points with which the PCD is communicating. In one embodiment, an access point may communicate with the PCD in a wireless manner in a first geographic area of the access point, wherein the first geographic area is the range of the access point, and the access point may determine a geographic location of the PCD in a second smaller geographic area within the first geographic area. In other words, the access point may determine the geographic location of the PCD with more granularity than the range of the access point.

An access point may use one of several different methods to determine the geographic location of the PCD. The geographic location of the PCD may be determined with a fairly high degree of precision, using one or more access points and one or more of several different techniques.

In one embodiment, the location circuitry may perform signal strength measurements of signals transmitted to the access point by the PCD. The received signal strength may then be compared to the transmitted signal strength, allowing for a determination of the approximate distance between the access point and the PCD. This approximate distance may be used to determine an approximate region in which the user may be located, e.g., a concentric ring region centered around the access point.

The location circuitry may instead or also allow an access point to determine the bearing of an incoming signal (i.e. the direction from which. the transmitted signal originated). An approximate location of a PCD may then be determined by using the bearing information, or by combining the bearing and distance information.

In another embodiment, two or more access points may be used in conjunction with each other to determine the bearing of an incoming signal using triangulation techniques. In this embodiment, each access point involved in the triangulation may individually determine a distance to the PCD. Since the access points involved are located at a fixed distance from each other, the location of the PCD may be determined using standard triangulation techniques.

Distance from an access point may also be determined via the use of data packets including time stamps. When a mobile user carrying a PCD enters a geographic region for a given access point, it's presence may be detected by the access point. After synchronizing clocks with the PCD, the access point may then transmit a first data packet which includes a time stamp. After receiving the data packet, the PCD may respond by transmitting a second data packet back to the access point. The second data packet may include the original time stamp, and may also include a second time stamp indicating the time at which the first data packet was received. The access point may then calculate the distance to the PCD based on the round trip time of the signal, or based on the one-way transit time of the signal.

In some situations, particularly if the PCD has a heavy processing workload, there may be a delay in responding to the first data packet from the access point. In such cases, the second data packet transmitted by the PCD may include a third time stamp which may indicate the time of transmission of the second data packet. Upon receiving the second data packet, the access point may then assign a fourth time stamp, and calculate the distance based on the difference between the third and fourth time stamps.

Thus, in one embodiment, a respective access point determines a relative geographic location of the PCD relative to the access point. The access point, or a service provider, may then determine the geographic location of the PCD using the known geographic location of the access point and the relative geographic location of the PCD relative to the access point. This may be accomplished using map information that is based on the known geographic location of the access point.

The access point may provide geographic-based services to a user of the PCD based on the information regarding the geographic location of the PCD. Alternatively, the access point may provide information regarding the geographic location of the PCD to a service provider, and the service provider may then provide geographic-based services to a user of the PCD based on this information.

As noted above, the access point may determine information regarding the geographic location of the PCD. The information regarding geographic location of the PCD may involve information regarding one or more vendors or vendor locations that the PCD is located in or proximate to. In one embodiment, a memory coupled to the network, such as in the access point, stores map information including the first geographic area of the access point. The system, e.g., a network device or the access point, may then determine the proximity of the PCD to a vendor using the map information and the geographic location of the PCD. Thus, the access point may use the geographic location of the PCD to determine a proximity of the PCD to one or more vendors. Stated another way, the access point may determine a vendor location of a plurality of possible vendor locations in which the PCD is located or proximate to. The information regarding the geographic location of the PCD thus may include information regarding the PCD's proximity to vendors or vendor locations. The geographic information provided to a PCD may include graphical information to illustrate to its user the approximate location of a PCD within a mall, airport, or other facility. In some embodiments, geographic information may be presented to a PCD as a floor plan of a mall, airport, or other facility, or as a map of a city or region.

Geographic-based services may be provided to a user of the PCD based on the information regarding the geographic location of the PCD. For example, where the user of the PCD is determined to be physically located proximate to a first vendor, then advertising information corresponding to the first vendor may be provided to the PCD. The geographic-based information provided to the PCD may originate from a service provider or from the access point itself. The information provided to the PCD may be any of various types. The access point may transmit various information to the PCD, wherein the information is dependent upon the geographic location of the PCD and may also be dependent upon demographic information of the user of the PCD.

Other types of geographic-based services may be provided to the user. For example, the access point may transmit the geographic location of the PCD to a memory of the PCD, thereby advising the PCD of its location. Also, the access point may provide directions to a specified location responsive to a query from the PCD, wherein the directions may be based at least in part upon the geographic location of the PCD. Further, the access point may determine a direction of motion of the PCD based on two or more determinations of the geographic location of the PCD over a period of time.

Thus the geographic location information may be useful to both the mobile user and service providers, e.g. content and information providers, coupled to the network. For example, if an access point locates a PCD near a bookstore in an airport, the network may respond by informing the user of a promotion by the bookstore. Similarly, a user of a PCD may query the network for directions to a specific location, such as a food court, a restroom or an ATM machine. The network may then determine directions based on the current location of the PCD. One or more access points may also be used to determine a direction of motion of the user of the PCD, and thus provide feedback to the user while moving to the target location of the query.

BRIEF DESCRIPTION OF THE DRAWINGS

Other objects and advantages of the invention will become apparent upon reading the following detailed description and upon reference to the accompanying drawings in which.

Figure 1:
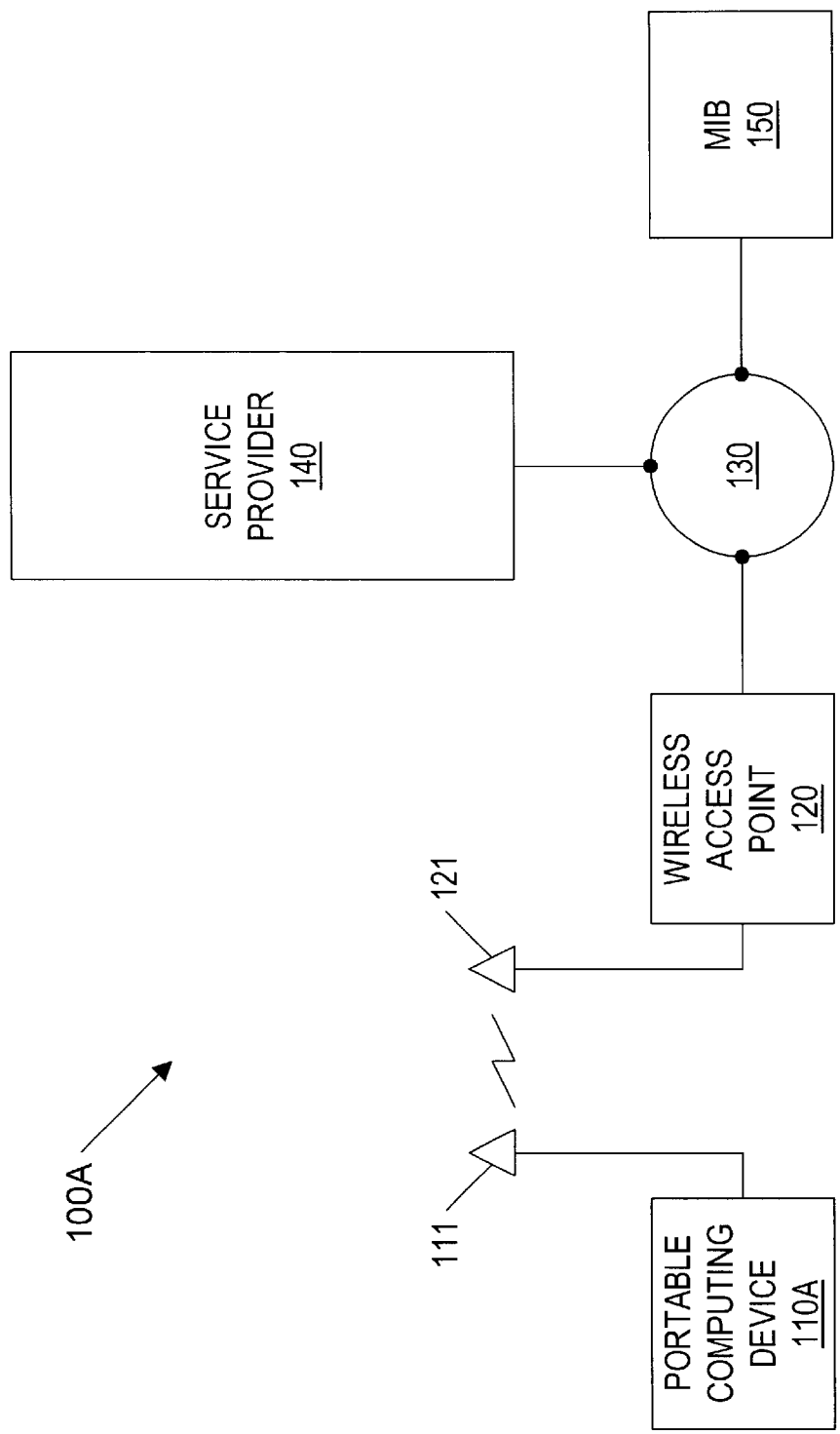
FIG. 1 is a block diagram of one embodiment of a geographic based wireless communication system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Incorporation by Reference

The following documents are herein incorporated by reference in their entirety as though fully and completely set forth herein:

U.S. Pat. No. 5,835,061 entitled "Method and Apparatus for Geographic-Based Communications Service", whose inventor is Brett B. Stewart, is hereby incorporated by reference in its entirety as though fully and completely set forth herein.

U.S. Pat. No. 5,969,678 entitled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 entitled "Geographic Based Communications Service", whose inventors are Brett B. Stewart and James Thompson, is hereby incorporated by reference in its entirety as though fully and completely set forth herein.

U.S. patent application Ser. No. 09/433,818 entitled "A Network Communication Service with an Improved Subscriber Model Using Digital Certificates", whose inventors are Brett B. Stewart and James Thompson, is hereby incorporated by reference in its entirety as though fully and completely set forth herein.

FIG. 1: Geographic Based Wireless Communication System

FIG. 1 shows one embodiment of a geographic based wireless communication system or network 100A. The wireless communications system is preferably similar in many respects to the system described in U.S. Pat. No. 5,835,061.

The wireless communication system 100A may include a plurality of wireless access points 120, a plurality of service providers 140, and/or MIBs 150. Access points (APs) 120 for the network may be widely distributed in various facilities, such as airports, mass-transit stations, shopping malls, and other businesses, such as coffee shops or restaurants at an airport. When in sufficiently close range to an access point, the PCD 110 may access the network through, for example, a network card. In one embodiment, the APs 120 may be arranged at known geographic locations and may provide geographic location information regarding the geographic location of the mobile user (MU) or the PCD 110. Thus, according to one embodiment of the geographic-based communications service, one or more access points may be configured to provide an approximate determination of the location of PCD 110. In another embodiment, the PCD 110 may provide geographic location information of the PCD 110 through the AP 120 to the network 130. For example, the PCD 110 may include GPS (Global Positioning System) equipment to enable the PCD 110 to provide its geographic location through the AP 120 to the network 130, e.g., service provider 140 located on the network 130.

FIG. 1 illustrates a simplified and exemplary embodiment of a portion of the wireless communications system 100A. As shown, the wireless communication system 100A may include PCD 110 with a wireless connection 111 (e.g., an antenna) in communication with wireless access point (AP) 120 having a wireless connection 121 (e.g., an antenna). The AP 120 may be coupled to a service provider 140 and a management information base (MIB) 150 through a centralized network 130. The network 130 may comprise a wired network, a wireless network or a combination of wired and wireless networks.

The service provider 140 and MIBs 150 each may comprise a computer system coupled to the network 130. The network 130 may comprise one or more wired or wireless local area networks and/or one or more wide area networks (e.g., the Internet). Each service provider 140 may include one or more computers or computer systems configured to provide goods, information, and/or services as appropriate for the service provider. One or more service providers 140 may be coupled to network 130. The one or more service providers 140 may also connect to network 130 in a wireless fashion. The one or more MIBs 150 may be comprised in one or more service providers 140.

The wireless communication may be accomplished in a number of ways. In a preferred embodiment, PCD 110 and wireless AP 120 are both equipped with an appropriate transmitter and receiver compatible in power and frequency range (e.g., 2.4 GHz) to establish a wireless communication link (e.g., wireless connection 111 and wireless connection 121, respectively). For example, PCD 110 may include a wireless Ethernet card for communicating with APs 120. Wireless communication may also be accomplished through cellular, digital, or infrared communication technologies, among others.

To provide user identification and/or ensure security, the PCD 110 may also be equipped with a certificate or other identification information that may be transmitted to and recognized by the wireless AP 120. This identification information may then be relayed to different service providers 140 and/or MIB 150 that are coupled to wireless AP 120 via centralized network 130. This identification information may utilize recognition of a MU before providing access to system services, thereby providing a measure of security and a service billing mechanism. The identification information may also identify the user to enable a service provider to use known information regarding the user or use demographic information in conjunction with the known geographic location of the PCD 110 to provide specific information (e.g., advertising) to the user.

Figure 2:
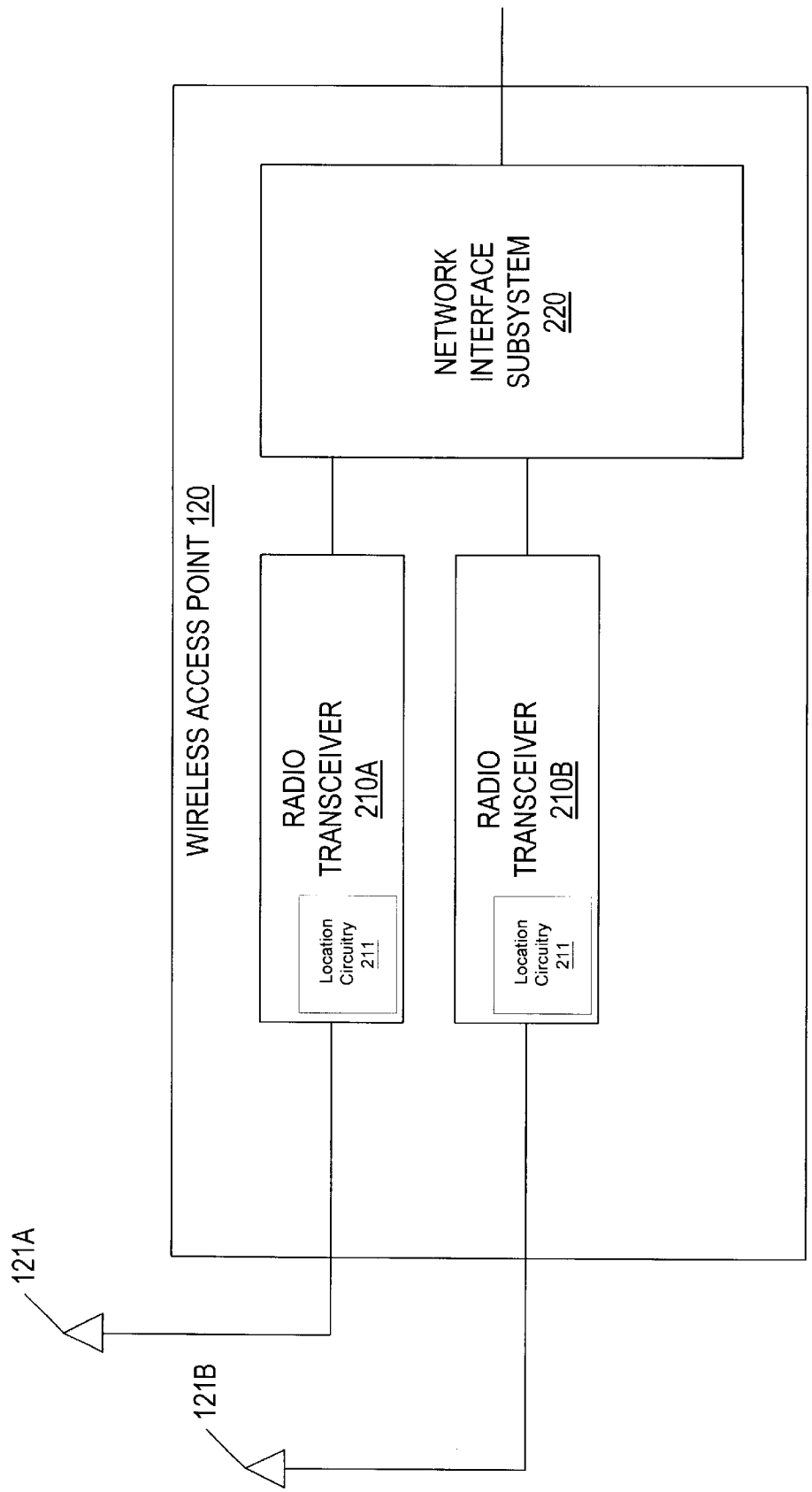
FIG. 2 is a block diagram of one embodiment of a wireless Access Point (AP)

FIG. 2: Wireless Access Point

FIG. 2 is a block diagram of one embodiment of a wireless access point (AP) 120. The wireless AP 120 may comprise a network interface subsystem 220 coupled to radio transceiver 210A and radio transceiver 210B. Both radio transceiver 210A and radio transceiver 210B are coupled to antennas 121A and 121B, respectively. One or more of the radio transceivers 210A and 210B may also include location circuitry 211.

A transceiver may be defined as an electrical component that comprises one or both of a transmitter and a receiver. In one embodiment of the present invention, radio transceiver 210A receives communications from PCD 110 and radio transceiver 210B transmits communications to PCD 110. In another embodiment, radio transceiver 210A receives and transmits from/to a PCD 110 while radio transceiver 210B receives and transmits from/to a different PCD 110. In either embodiment the transmitted information may contain security data or encoding that prevents others from receiving and decoding the transmitted data.

The network interface subsystem 220 may be configured to receive information from both service providers 140 and MIB 150 via centralized network 130. The network interface subsystem 220 may provide signals to the centralized network 130 over a wired connection or wireless connection. The network interface subsystem 220 may determine the proper radio transceiver (such as 210A or 210B), and may use a multiple access scheme to differentiate among users for transmitted and received data. For example, each PCD 110 may communicate with wireless AP 120 using a selected multiple access scheme such as Wireless Ethernet (CSMA/CD), CDMA, FDMA, or TDMA. When a wireless connection is initially made between a PCD 110 and wireless AP 120 parameters such as frequency, time slot and/or code of the wireless connection may be determined. This determination may be used to ensure that only a particular PCD 110 receives the transmitted data intended for that particular PCD 110 and that wireless AP 120 knows, when it receives data from a PCD 110, which PCD 110 the received data is from. This may be important when there are multiple MUs concurrently communicating with one wireless AP 120.

The network interface subsystem 220 may also contain a memory. This memory may be used to store information specific to a particular wireless AP 120, such as geographic location of the wireless AP 120, a map of the local area, and an index of local services, e.g., local restaurants, hotels, etc. This memory allows an AP 120 to respond to many requests for information by a MU using PCD 110, without requiring access to a service provider 140 or a MIB 150. The memory in the AP 120 may also store a software program for determining the geographic location of the PCD 110. The memory in the AP 120 may also store map information useable in determining a proximity of the PCD 110 to vendors or vendor locations.

The antennas 121A and 121B may be any of a number of different antenna types. The type of antenna used may be specific to the type of wireless communication used. For example, if a particular wireless communication is accomplished through a high frequency radio wave, the antenna may be, among others, a yagi, cardiod, collinear, parabolic, or radome antenna. If the wireless communication. is accomplished through infrared, the antenna may be a sensor panel that is sensitive to infrared light. The antenna that is used may have an impact on the area that a particular wireless AP 120 may service. For example, a small antenna may be able to communicate only with a MU using PCD 110 within a radius of five feet, while a larger and/or more powerful antenna may be able to communicate with MUs using PCD 110 throughout an entire building.

Location circuitry (LC) 211 may include analog and/or digital circuitry configured for determining the approximate location of a user of a PCD 110. The location circuitry may also be implemented by a software program executed by a processor comprised in the AP, or by programmable logic, such as an FPGA, or by other means. In general, LC 211 may include any type of software and/or hardware implementation that may be used to determine the approximate location of a PCD 110. The LC 211 is preferably able to determine the location of the PCD 110 of the user with a greater granularity than simply the known geographic location of the access point 120. For example, in various embodiments the access point 120 may be able to determine the approximate location of the PCD 110 within 50 feet, 20 feet, 10 feet, 5 feet, or 1 foot of the actual location of the PCD 110.

LC 211 may use any of various technologies in determining the approximate location of the user. For example, LC 211 may include circuitry for measuring the signal strength of a signal received from a PCD 110 and determining the bearing of an incoming signal from a PCD 110. Timing circuitry may also be included, and may be used for setting and reading time stamps of data packets transmitted by both AP 120 and PCD 110. The location circuitry 211 in 2 or more different APs 120 may act together to perform triangulation techniques.

Network 130

The network 130 is preferably a portion of the Internet. For example, network 130 may be a local area network (LAN) that is coupled to the Internet. Network 130 may include or be connected to other types of communications networks, (e.g., other than the Internet) such as the public switched telephone network (PSTN). Thus a MU using PCD 110 may send and receive information from/to the PSTN or other communication network through a service provider. The network 130 may also include or be coupled to another wide area network 130, such as a proprietary WAN.

Portable Computing Device

The portable computing device 110 (referred to generally as PCD 110) may be any of various types of devices, including a computer system, such as a portable computer, a personal digital assistant (PDA) (e.g., a Palm Pilot), an Internet appliance, a communications device, such as a cellular phone, digital wireless telephone, or other wired or wireless device. The PCD 110 is designed to communicate with an access point 120, (referred to generally as AP 120). The PCD 110 may include a memory which stores information regarding desired information or services. The memory may also store demographic information of the user.

In the present disclosure, the term "demographic information" of a user is intended to include, but is not limited to, information such as: full name, address, contact information such as telephone number and email address, daily schedule, family members, hobbies, past purchases, spending habits, buying preferences, hotel preferences, restaurant preferences, rental car preferences, banking habits, memberships such as airline incentive programs (e.g., American Airlines (AA) Advantage Program), rental car incentive programs (e.g., Hertz Number One Club Gold), or hotel frequent stay incentive programs associations, and other information. The term "past activities" may be used synonymously with the term "demographic information".

Figure 3:
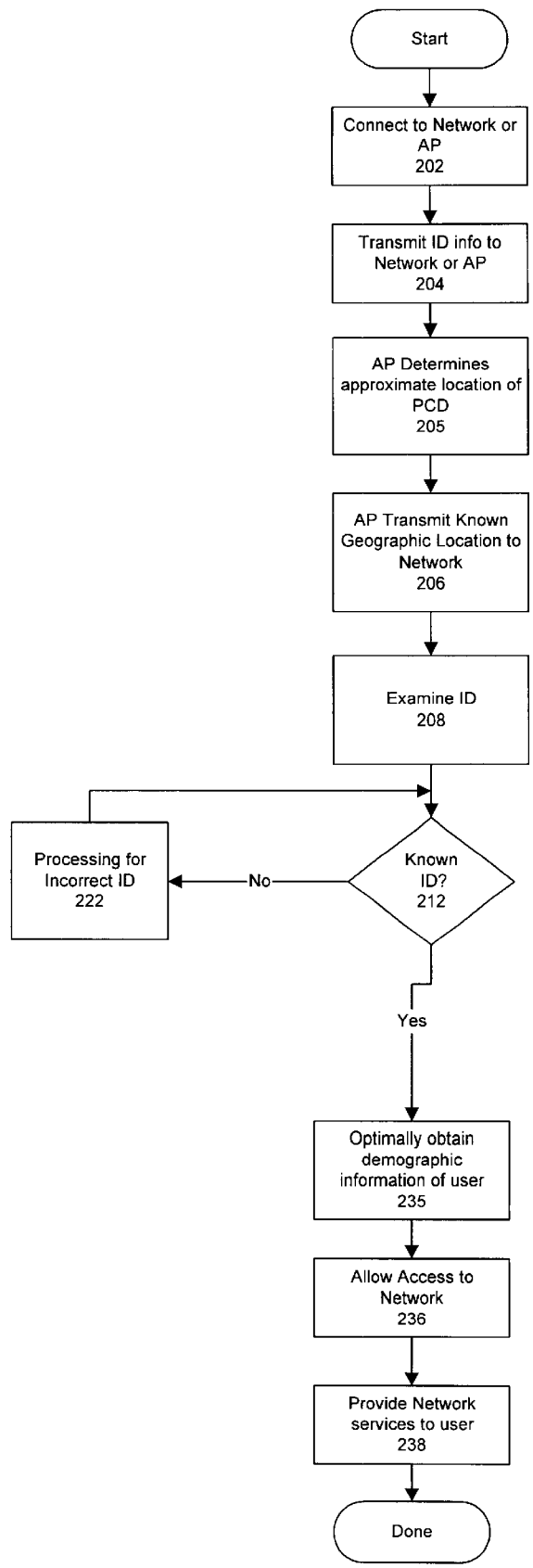
FIG. 3 is a flowchart diagram illustrating the operation of allowing access to a network and determining a precise location of the mobile unit for one embodiment of the geographic based wireless communication system.

FIG. 3—Network Access

FIG. 3 is a flowchart diagram illustrating one embodiment of operation of allowing access to a network and determining an approximate (or precise) location of PCD 110. It is noted that various steps may be omitted or performed in different orders.

In one embodiment, the PCD 110 may include a digital certificate stored in the memory of the PCD. The digital certificate may store information needed for user authentication and security on the network. The digital certificate may also store various information, such as demographic or sponsorship information of the user. The sponsorship information may comprise references to more detailed sponsorship information stored on a separate server database as described above. The digital certificate may also store references to other information, such as demographic information of the user, charging information of the user, or other information to the user. In one embodiment, the digital certificate may be configured to store information useful in enabling an AP 120 to determine the approximate location of the PCD 110, such as time stamp information.

In one embodiment, the system and method may use geographic location information of the mobile user and other information, such as information stored in the digital certificate or user demographic information or other information stored on the network, to provide various targeted services or information to the user or an improved network access model.

As shown, in step 202 the user connects to an access point 120 of the network. For example, the user may be walking in an airport with a PCD 110 and may connect in a wireless fashion to an access point 120 located at the airport. In another scenario, the user may be walking in a shopping mall with a PCD 110 (e.g., a PDA, such as a Palm Pilot) and may connect in a wireless fashion to an AP 120 in the mall. In general, the user may connect to the network or an access point 120 of the network in a wired or wireless fashion.

In step 204 the personal computing device (PCD) of the user may optionally transmit identification information (ID information) to the network or to the access point (AP) of the network. The identification information may take any of various forms. For example, the identification information may comprise a MAC (media access controller) ID or System ID which is comprised on a wired or wireless Ethernet card of the personal computing device used by the user. The identification information may comprise other types of more secure identification as desired. The identification information may be used to determine if the user is a subscriber to the network and/or to provide demographic-based services. Alternatively, the PCD 110 may not transmit any identification information to the AP 120. In this embodiment, geographic-based services may be provided to the user regardless of the user's identity, and a subscription may not be necessary to access the network.

In Step 205, the AP 120 may determine the approximate location of the PCD 110. The approximate location information may include the known location of the AP 120 itself, as well as information concerning the location of the PCD 110 (e.g., bearing and/or distance) relative to the AP 120. In one embodiment the approximate location of the PCD 110 relative to the access point 120 may be determined, and this information may be combined with the known geographic location of the access point 120 itself to determine the approximate geographic location of the PCD 110. This may be accomplished using map information that is based on the known geographic location of the access point. Thus, the approximate location of the PCD 110 may be determined using the determined location of PCD 110 relative to the access point 120 and the map information of the geographic area stored by the access point 120.

In one embodiment, an access point 120 may communicate with the PCD 110 in a wireless manner in a first geographic area of the access point 120, wherein the first geographic area is the range of the access point 120, and the access point 120 may determine a geographic location of the PCD 110 in a second smaller geographic area within the first geographic area. In other words, the access point 120 may determine the geographic location of the PCD 110 with a granularity finer than the range of the access point 120 (i.e. within a smaller area than the range of the access point).

Figure 13A:
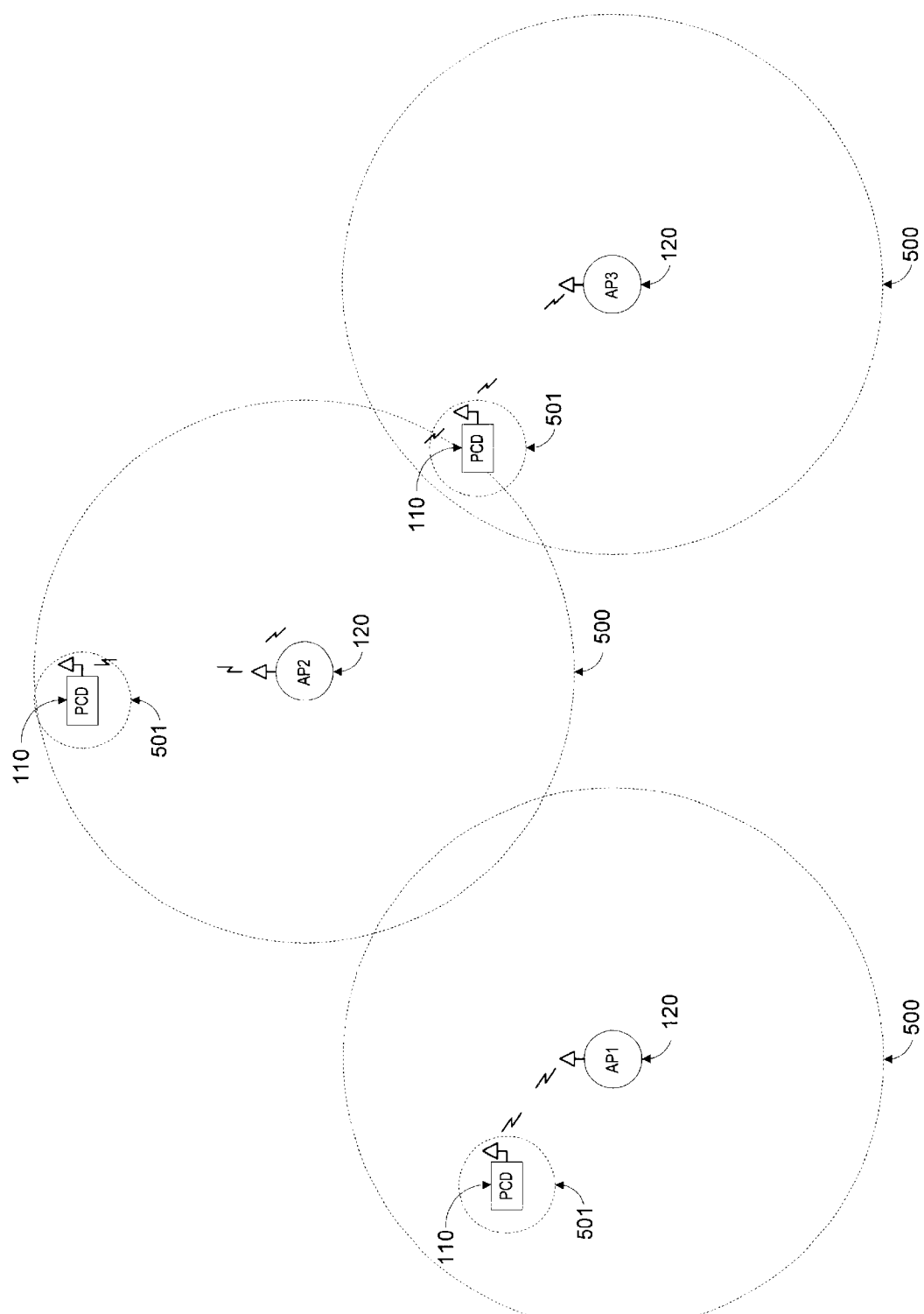
FIG. 13A illustrates a plurality of access points with their respective regions of detection, where an AP can identify a location of an MU located within a second, smaller geographic region using bearing and distance information of the MU.
Figure 13B:
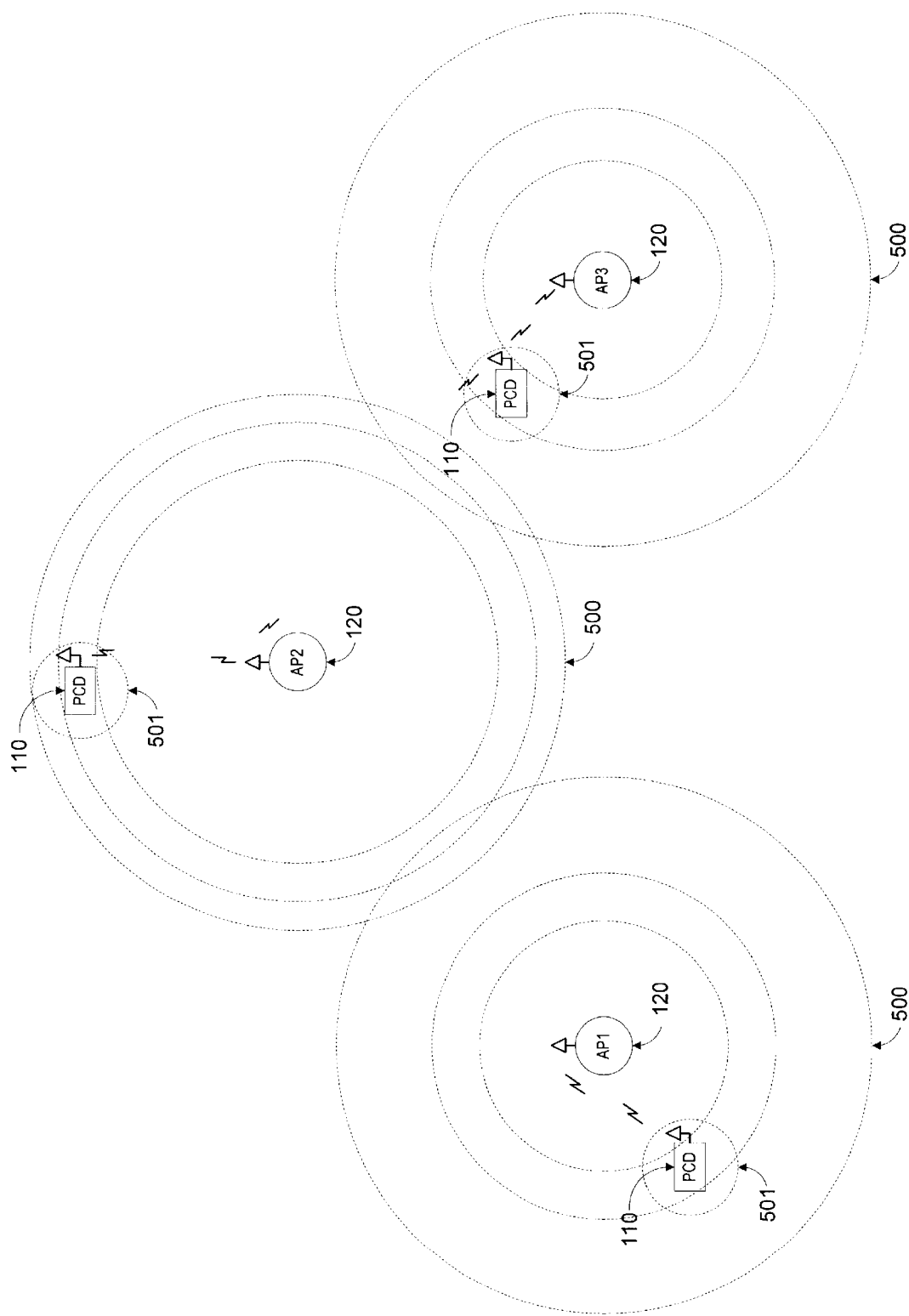
FIG. 13B illustrates a plurality of access points with their respective regions of detection, where an AP can identify a location of an MU located within a second, smaller geographic region (a concentric ring region) using distance information of the MU.

The approximate location of the PCD 110 may be determined using one or more of several different techniques. These techniques include, but are not limited to, performing one or more of signal strength measurements and transmission/receipt of time stamped data packets. Where the AP 120 determines the approximate location of the PCD 110 using signal strength measurements or transmission/receipt of time stamped data packets, the AP 120 may only determine an approximate distance of the AP 120 relative to the AP 120. This approximate distance may be used to determine a concentric ring region in which the PCD may be located, as shown in FIG. 13B. Other information may then be used regarding the geography of the area to further determine an approximate location of the PCD 110. For example, the AP 120 can presume that the user is not located on the airport tarmac or in a "forbidden area" of the airport, and hence the AP 120 can further "narrow down" the locations where the user of the PCD 110 might be. Thus the AP 120 can use the approximate distance information in conjunction with map information of the area to determine possible locations of the PCD 110.

In some embodiments, multiple AP's may work in conjunction to determine an approximate location of the PCD using triangulation techniques. This may involve determining both bearing and distance information to determine the second region, as shown in FIG. 13A.

The various techniques used to determine the approximate location of the PCD may be implemented using location circuitry, such as LC 211 described in reference to FIG. 2. These location techniques are discussed in greater detail with respect to FIGS. 13–15.

In step 205 the AP 120 may also generate information regarding the geographic location of the PCD 110. This information may comprise information regarding one or more vendors or vendor locations that the PCD is located in or proximate to. As used herein, the term "vendor" or "vendor location" is intended to include any of various types of provider, location or business that offers products, such as goods or services, including, but not limited to, stores or shops (e.g., book stores, newsstands, clothing stores, electronics stores, etc.), restaurants, ATM machines, rental car counters, airport counters, etc.

In one embodiment, a memory is coupled to the network, such as in the access point, which stores map information including the first geographic area of the access point. For example, if the access point 120 is located at a gate in an airport, the map information may indicate the locations of various airline gates, shops, restaurants, etc., within the range of the access point 120. If the access point 120 is located in a shopping mall, the map information may indicate the locations of various stores in the mall.

The system, e.g., a network management device which couples to APs 120, or the access point 120, may then determine the proximity of the PCD 110 to a vendor or vendor location, using the map information and the geographic location of the PCD 110. Thus, the access point may use the geographic location of the PCD 110 to determine a proximity of the PCD 110 to one or more vendors. Stated another way, the access point 120 may correlate the determined geographic location of the PCD 110 with the map information to determine a vendor location of a plurality of possible vendor locations in which the PCD 110 is located or proximate to. The information regarding the geographic location of the PCD 110 thus may include information regarding the PCD's proximity to vendors or vendor locations.

For example, the information regarding the geographic location of the PCD 110 may indicate that "the user is at American Airlines terminal 32" or the "user is in (or just outside of) the Barnes & Noble bookstore" or "the user is in (or just outside of) ABC restaurant". This information can then be used by a service provider to provide targeted information (e.g., advertising) or targeted services to the user.

In step 206 the access point to which the user has connected may transmit the determined geographic location information to the network (e.g., an information provider on the network). The geographic location information may indicate the location of the PCD 110, which may be based on the relative geographic location of the PCD 110 relative to the AP 120, possibly as well as the known location of the AP 120, e.g. map information of the geographic area serviced by the AP 120. In one embodiment, the access point 120 may provide information regarding the geographic location of the PCD to a service provider, and the service provider may then provide geographic-based services to a user of the PCD based on this information. In an alternate embodiment, the access point 120 may provide geographic-based services to a user of the PCD 110 based on the information regarding the geographic location of the PCD 110, possibly without transmitting the geographic location information to the network. As discussed further below, this known geographic location information of the PCD 110 may be used to provide services to the user which are dependent upon the geographic location of the PCD 110 or user.

In step 208 the network provider may examine the received identification information, e.g., the user ID or other identification information.

In step 212 the method determines if the identification information (e.g., the user ID) is valid. If the identification information is determined to not be a known user ID by the network provider, then in step 222 the method may perform processing to account for the unknown user ID. Step 222 may also involve performing processing for an unknown or incorrect digital certificate, as discussed further below. As noted above, steps 204, 208, 212 and 222 are optional and may be omitted in some embodiments.

If, on the other hand, the user ID is determined to be valid, demographic information for the user ID may be obtained from a service provider (Step 235). Such demographic information may include any of the various types of information described above. If the ID is valid, or if no identification information is required, then operation proceeds to step 236.

In step 236, the method allows the personal computing device of the user access to the network. Once the user gains access to the network, various service providers may provide services (Step 238) or information based on the above information, e.g., based on one or more of known geographic location information sponsorship information, demographic information, or charging information. Examples include targeted advertising and promotions for goods or services, various types of information such as directions to desired locations, games, etc.

Thus, geographic-based services may be provided to a user of the PCD 110 based on the information regarding the geographic location of the PCD. For example, where the user of the PCD 110 is physically located proximate to a first vendor (e.g., in or close to a certain store), and this proximity is determined, such as by the access point 120, then advertising information corresponding to the first vendor may be provided to the PCD 110. The information provided to the PCD 110 may originate from a service provider or from the access point itself. The information provided to the PCD 110 may be any of various types, such as advertising of the first vendor, e.g., promotions or offers.

The access point 120 may transmit various information to the PCD 110, wherein the information is dependent upon the geographic location of the PCD 110 and may also be dependent upon demographic information of the user of the PCD 110. For example, the service provider may determine that the user is in a book store, and the service provider may access demographic information of the user and determine that the user enjoys certain types of books or books by certain authors. The service provider may then generate and provide certain targeted advertising through the access point 120 to the PCD 110 of the user based on this knowledge, e.g., an advertisement or promotion (discount) on the respective book(s). As another example, the service provider may determine that the user is at or close to a rental car counter of a first rental car agency, and the service provider may accordingly generate and provide certain targeted advertising for another competing rental car agency to attempt to lure the customer to the other rental car agency. Various other examples are envisioned.

Other types of geographic-based services may be provided to the user. For example, the access point 120 may transmit the geographic location of the PCD 110 to a memory of the PCD 110, thereby advising the PCD 110 of its location. Also, the access point 120 may provide directions to a specified location responsive to a query from the PCD 110, wherein the directions may be based at least in part upon the geographic location of the PCD 110. Further, the access point may determine a direction of motion of the PCD 110 based on two or more determinations of the geographic location of the PCD 110 over a period of time.

Thus the geographic location information may be useful to both the mobile user and service providers, e.g. content and information providers, coupled to the network. For example, if an access point 120 locates a PCD 110 near a bookstore in an airport, the network may respond by informing the user of a promotion by the bookstore. Similarly, a user of a PCD 110 may query the network for directions to a specific location, such as a food court, a restroom or an ATM machine. The network may then determine directions based on the current location of the PCD 110. One or more access points 120 may also be used to determine a direction of motion of the user of the PCD 110, and thus provide feedback to the user while moving to the target location of the query.

For more information on the use of geographic location information for providing geographic based services, please see U.S. Pat. No. 5,835,061 and U.S. patent application Ser. No. 09/433,817, as well as the other patents and patent applications referenced above.

FIGS. 4–12: Embodiments of Geographic Based Communication System Usage

FIGS. 4 through 12 illustrate examples of embodiments of usage of the geographic based communication system. Geographic based communication systems may include systems similar to those shown above with respect to FIG. 1.

For some service providers, access to a service provider generally may be first granted to a MU before the methods described in these figures may be used. Once access is granted (e.g., the MU is registered), the various goods, information, and/or services provided by the various service providers are available to the MU through the use of their PCD 110 and an access point 120. For other service providers, access may be provided to any MU regardless of or without any registration or identification process. For example, geographic-based advertising services may be provided to all MUs regardless of any authentification or registration.

Service providers 140 may include providers of a wide variety of goods, information, and/or services. Examples of service providers 140 include, but are not limited to, car rental agencies, hotels, restaurants, airline reservation centers, banks, stores, malls, taxi services, bus and train reservation offices, printing services, on-line database services, message services, E-mail providers, advertising providers, and other content providers. In addition, service providers may be designed to track, record, and predict demographic information, e.g., eating, buying, spending, and other habits of a MU.

For example, upon learning that a MU is scheduling a trip to Austin, Tex., a service provider 140 may consider the previous trips by the MU, develop a suggested itinerary, and book travel, hotel, car and restaurant reservations. Service providers 140 thus may acquire knowledge about the habits of the MU over a period of time, store the information in a memory (such as in an MIB), and extrapolate information from past habits to predict future actions.

Service providers 140 may also provide information to other information and/or service providers. For example, an information provider may be designed to store information on eating habits of MUs. This data may be stored and analyzed in order to predict the choices each MU will make in the future. This information may be valuable to restaurants frequented by the MU, such as for targeted advertising. This information may also be valuable in areas that a MU visits infrequently or has never been to before. The restaurant may also receive general demographic information about the MU (e.g., age, sex, address, etc.) from the MIB 150. Specialized information may only be available through a specialized information provider. Similarly, a service provider 140 may gather information on the demographics of all the MUs registered in one or more of the MIBs 150. This information may instantly be gathered and charted to give an overall view of MUs according to geographic proximity to one or more access points 120. This information may comprise only the basic demographic data stored in one or more of the MIBs 150, or the information provider may query the respective MUs for additional information.

In a preferred embodiment, as mentioned above, each access point 120 in the network may be associated with a unique geographic location. The geographic location of each access point 120 may be stored in each respective access point 120 or in an MIB 150. For example, the MIB 150 or the AP 120 may store the latitude, longitude, altitude, and other geographic information such as a local map of the area served by each access point 120. This map information may be used as described above.

This determined geographic location of a PCD 110 may be useful for service providers 140 (e.g., retail businesses) within the geographic proximity of the access point 120 in order to send/receive information, such as advertising, or provide a service, to/from the MU's PCD 110, wherein the information may be selected and transmitted, or the service provided, based on the known geographic location of the MU.

In one embodiment, each AP 120 may receive the same data from a respective network interface subsystem 220 and broadcast this data to all MUs. For example, if a particular AP 120 is designed to provide MUs using PCDs 110 with a map of the local area, the respective network interface subsystem 220 may repeatedly send the local map to each data port 230 regardless of the identities of the attached PCDs 110. In one embodiment the AP may be configured to only provide this geographic-based information, and is not capable of providing MU-specific information. Alternatively, the AP 120 may also be configured to provide this geographic information to all MUs as well as MU-specific or MU-dependent information.

An approximate location of the PCD 110 may be determined by one or more access points 120 upon detection of the PCD 110. Access points 120 may determine an approximate location of a PCD 110 within a radius of 50 feet, 20 feet, 10 feet, 5 feet or 1 foot of the exact location of the PCD 110 for various embodiments. Determination of the approximate location may be accomplished using one or more of various techniques, which may include signal strength measurements, bearing determination, signal travel time (which may be determined with time-stamped data packets) and/or triangulation. Such various techniques may allow an access point 120 to determine the location of a PCD 110 relative to the access point 120. This information may then be combined with the known geographic location of the access point 120 to determine the known geographic location of the PCD 110. Since the geographic location of each access point 120 is defined and known, such as by each respective MIB 150, detection of the presence of a PCD 110 by an access point allows a MIB 150 to know the approximate location of the mobile user of PCD 110 at any given time.

In one embodiment of the present invention, the system may determine the location of the PCD 110, and in some cases may even provide continual tracking of the PCD's whereabouts. Continual tracking of the PCD's whereabouts may be performed by multiple determinations of a PCD's location relative to one or more access points 120. Upon establishing a connection with an access point 120, the PCD 110 may transmit a message inquiring "Where am I?".

Alternatively, an access point 120, upon detection of a PCD 110 in its detection range, may transmit a request for a locator signal to the PCD 110. The PCD 110 may respond by transmitting the locator signal to the access point 120. Multiple signal transmissions by both the PCD 110 and the access point 120 may be used depending on the technique used to determine the location of the PCD lative to the access point 120.

After determining the location of the PCD 110 relative to the access point 120, the access point 120 may transmit the location information of the PCD 110 to PCD 110, and also transmit the presence and location of the PCD 110 (e.g., which vendor location the user is in or close to) to one or more service providers. These service providers may then transmit information, such as advertising, or services, to the PCD 110 (for use by the mobile user of the PCD 110), based on the location information. The PCD 110 may also initiate actions based on this location information.

In an alternative embodiment, one or more selected access points 120 may be programmed to watch for the arrival of a particular PCD (target PCD). Upon detecting the presence of the target PCD, the access point 120 establishing the link with the target PCD sends a message directly to a service provider, such as a rental car agency, hotel, etc., to arrange for the appropriate services to be ready for use by the MU upon the MU's arrival. Since the message has been sent, other access points. 120 then be directed to cease watching for the target PCD.

The MU in this embodiment may choose to signal the access point 120 that the PCD 110 is to be kept in contact with the closest access point 120 at all times. The access point 120 in this embodiment actively and preferably regularly "pings" the PCD 110 to determine if the PCD 110 is still in range of the access point 120. The access point 120 in this embodiment also transfers the ID of the PCD 110 to the closest access point 120 if the PCD 110 moves outside the geographic area served by the access point 120.

Since the geographic location of the PCD 110 may be determined fairly precisely, service providers 140 are able to provide only the information that is pertinent to the MU based on the PCD's geographic location and may track the MU's last reported location. For example, since updated information may be sent to the PCD 110 based on the location of the PCD 110, information that is pertinent only to the fact that the MU is, for example, in the hotel lobby need be sent back to the PCD 110 via the communication path between the access point 120 and the PCD 110.

Using this identification and location data, network 130 provides desired services (or arranges to provide desired services by accessing appropriate service providers) and information to the PCD 110. Based on the type of information required, network 130 may access one or more service providers 140 to provide the goods, information and/or services to the user based at least partially on the user's geographic location.

One embodiment of a system according to the present invention also has processing and memory access to operate in an interactive or adaptable mode. For example, when a MU arrives at the airport, his identity, as well as the fact that he is at the airport, is detected by an AP 120. The AP 120 may then determine the approximate location of the PCD 110 and provide the approximate geographic location of the PCD 110 to a service provider. One or more service providers with access to transportation schedules, flight status information, hotel or automobile rental information, weather information, ground maps or other information desired by the MU employs network 130 to send the user updated information about whether a connecting flight has been delayed, alternative routings, where to go to pick up a pre-specified rental car, directions to a preferred hotel and other types of information.

Figure 4:
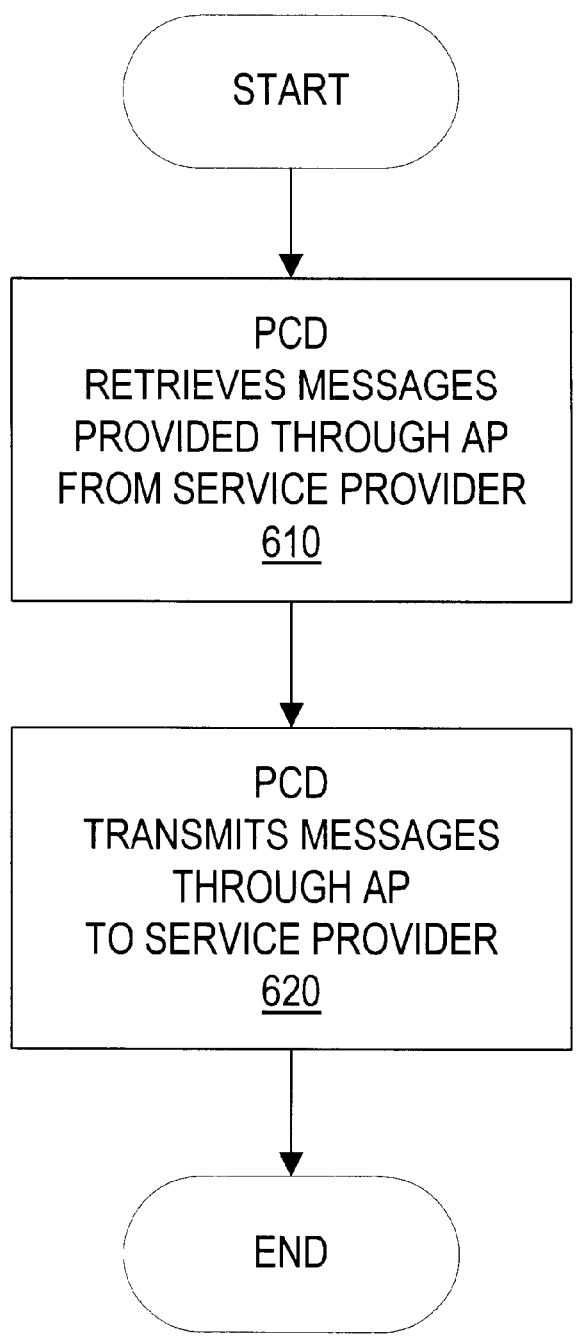
FIG. 4 is a flowchart of one embodiment of a method for providing a message exchange service for a MU through a geographic based communication system.

FIG. 4: Message Exchange Service Provider

The flowchart of FIG. 4 illustrates one embodiment of a method of exchanging messages through a service provider that offers a message exchange service for a MU, using a geographic based communication system. Here it is presumed that the PCD 110 of the MU has contacted or communicated with an AP 120.

In step 610 the PCD 110 retrieves messages through the AP 120. For example, a MU may instruct a message exchange service provider to retrieve E-mail from an existing account. The PCD 110 of the MU may provide various account information such as network address, login, password, etc. through the AP to the message exchange service provider. In response, the message exchange service provider may retrieve e-mail from the MU's account and forward this e-mail over the network. 130 through the AP 120 to the PCD 110 of the MU. The e-mail account information may be stored on the message exchange service provider so the MU does not need to re-enter the information on a subsequent connection, but rather the MU or PCD may provide an ID code. A message exchange service provider may also be capable of checking voice-mail messages and forwarding them to a PCD for perusal by the MU. This may be accomplished by the message exchange service provider converting voice-mail messages from analog to digital format and then transmitting the digital data to the PCD 110 through the AP. In another embodiment, the message exchange service provider only transmits the number of voice-mail messages to the PCD 110.

In step 620 the PCD 110 transmits messages through an AP to the message exchange service provider. Message formats may include, but are not limited to, e-mail, facsimile,: telephone, and video messages. Facsimile messages may be transmitted, for example, from a software application on the PCD 110.

For example, a document may be created using Microsoft WORD and transmitted through a message exchange service provider to a remote fax machine or PCD. A real-time video message may be sent, for example, to a remote PCD, or to any computing device connected to an attached network, such as the Internet, using software such as CUSeeMe or Microsoft NetMeeting. Alternatively, a video message may be recorded by a MU on their PCD 110 and sent to a remote PCD for future retrieval.

Figure 5:
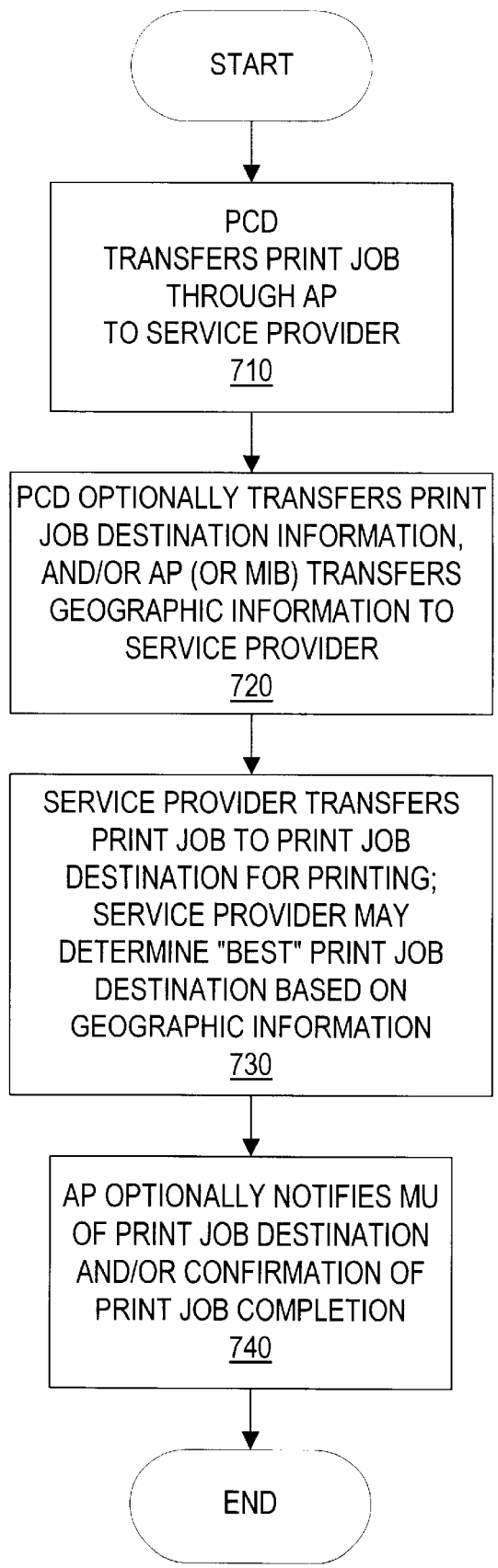
FIG. 5 is a flowchart of one embodiment of a method for completing a print job through a service provider that offers printing services through a geographic based communication system.

FIG. 5: Printing Service Provider

The flowchart of FIG. 5 illustrates one embodiment of a method of completing a print job through a service provider that offers printing services through a geographic based communication system.

In step 710 the PCD transfers a print job through the AP to the service provider. The print job may be sent in numerous different file formats. In one embodiment, the service provider printing service is set-up as a printer on the PCD. For example, a laptop computer user may receive information or drivers from a service provider that offers a printing service. This information or drivers enable the MU to add the printing service to the control panel of the PCD. Once installed, the drivers allow the MU to print any documents, figures, graphs, etc. to the service provider's printer, much like a local printer, simply by selecting the service provider's printing service as the output device. In another embodiment, the file to be printed (e.g., Microsoft WORD document, Microsoft EXCEL spreadsheet, Adobe PHOTOSHOP drawing, etc.) is sent to the printing service as an e-mail attachment. The file to be printed is then processed by the service provider to provide the proper data format to the printing device.

In step 720, the PCD optionally transfers print job destination information to the service provider. Alternatively, or in addition, the AP transfers geographic information of the PCD 110 to the service provider. In one embodiment, the AP 120 (the AP that the PCD is communicating with) sends geographic information to the service provider. The service provider may have several printing devices (e.g., laser printers, color printers, plotters, etc.) at multiple locations. The service provider may use the geographic information provided by the AP to select the printing device that is the closest to the geographic location of the PCD 110 received by the service provider that is capable of completing the received print job. For example, consider a MU who enters a hotel for a convention and needs several color documents printed from his PCD (e.g., a laptop computer) for a presentation. The MU connects his PCD 110 to an AP 120, with which he is registered, and establishes a connection with a service provider that offers printing services. The MU sends the print job from his PCD to the service provider through the AP. The AP determines the geographic location of the PCD 110 and sends this geographic information to the service provider, in addition to the print job. The service provider determines which printing device that offers the requested services is closest to the MU. In this example, because the MU is requesting poster color prints, the service provider may not be able to use the nearest printing device for this print job, but may need to access an oversized printing device that is further away.

In step 730, the service provider transfers the print job to the selected printing device. The service provider may determine the "best" printing device according to the geographic information of the PCD 110 received and the requirements of the requested print job. In one embodiment, a MU may instruct the service provider of a planned future geographic location at which the MU would prefer to pick up the print job. For example, a MU that is communicating with a wireless AP may not want the print job to be performed at the current nearest printing device to the AP. The MU may desire that the print job be sent to his final destination. For example, a MU who is on his way to the airport may desire a document to be printed for retrieval at the airport before boarding a plane. The MU may contact a service provider through his PCD through a connection to a wireless AP on the way to the airport. The MU may then send information from his PCD regarding the desired print location for the print job. The print job may then be sent to the airport. In addition, a MU may send time information from his PCD to a service provider offering printing services. For example, the MU traveling to the airport may not want the print job printed until immediately before he arrives. The service provider may store the print job and transmit the print job to the appropriate printer at the time desired by the MU.

In step 740, the service provider, through the AP, optionally notifies the MU of the print job destination (e.g., the selected printing device) and/or confirmation of the completion of the print job. In one embodiment, a confirmation of completion of the print job is sent to the PCD 110 from the service provider. If the PCD 110 is no longer connected to the AP 120, the AP 120 may store the printing confirmation for a period of time before deleting it. If the MU did not specify a print location, the service provider may send detailed information describing the location of the printing device. In addition, the service provider may send information regarding the fees that are due upon pickup or, alternatively, the fees that were charged to the MU account.

Figure 6A:
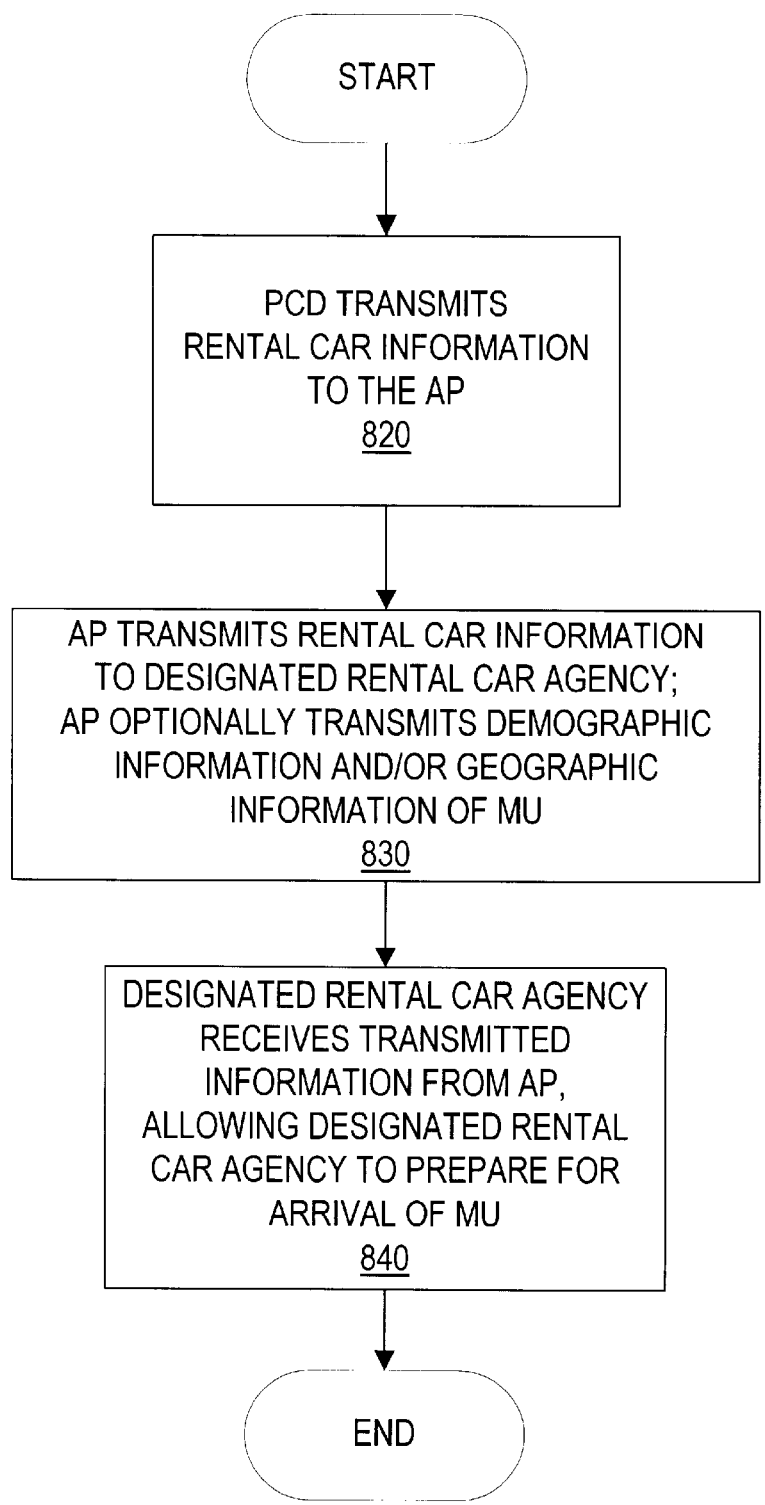
FIG. 6A is a flowchart of one embodiment of a method for reserving a rental car through a geographic based communication system.

FIG. 6A: Method for Placing Rental Car Reservations

Figure 8A:
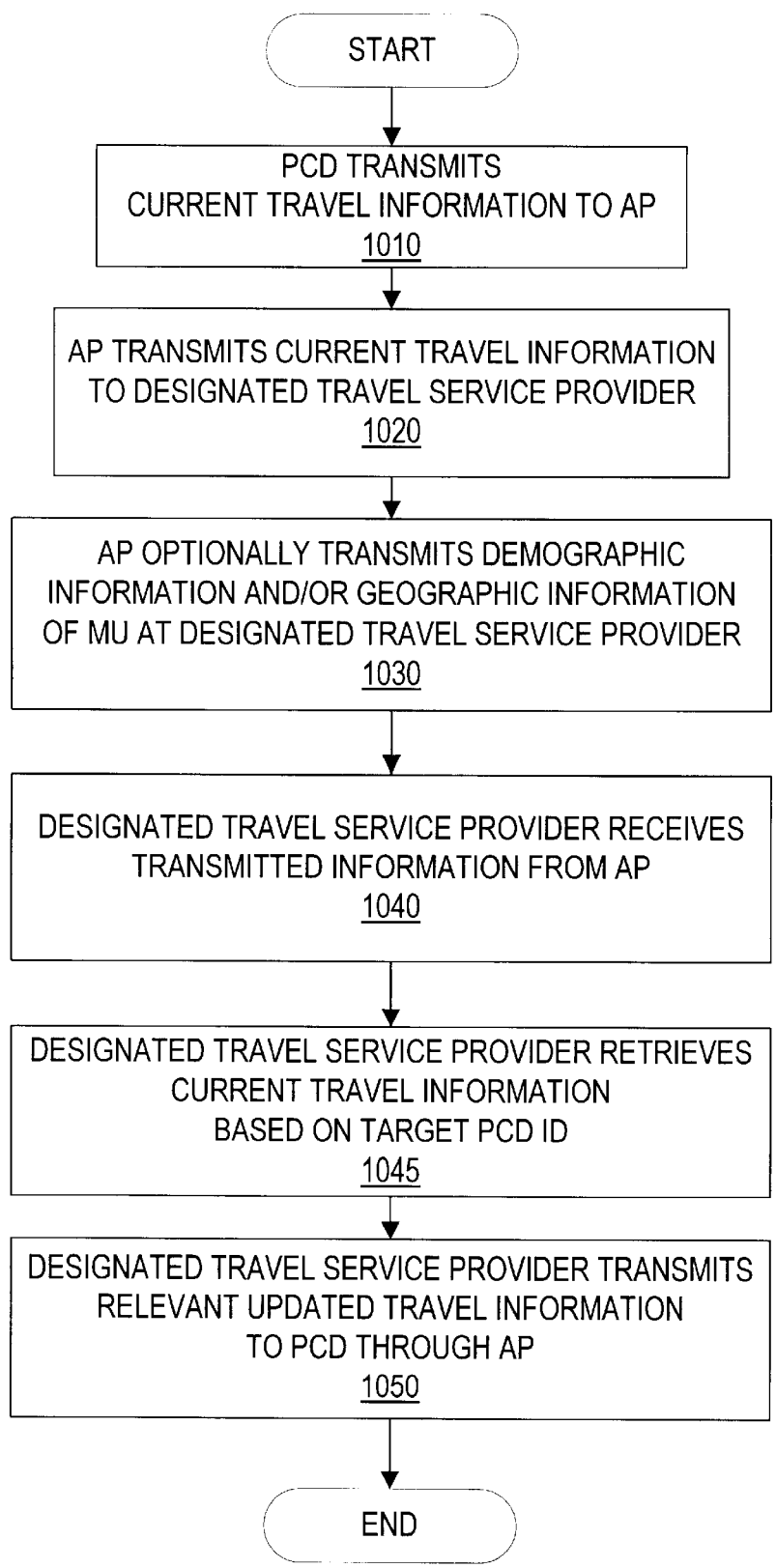
FIG. 8A is a flowchart of one embodiment of a method for reserving travel services through a geographic based communication system.

The flowchart of FIG. 8A illustrates one embodiment of a method of reserving and/or processing a rental car through a service provider (e.g., a rental car agency) through a geographic based communication system.

In step 820 the PCD 110 transmits rental car information to the AP 120. In a preferred embodiment the MU has a preferred rental company, car type, and insurance preferences stored in the database of user information 325B and/or the service provider (the rental car agency). This may allow the MU to simply transmit (using the PCD) the identification of the MU as well as location and duration of the rental period to the AP 120. For example, the information stored in the service provider's memory for a particular MU may indicate that the MU typically requests a four-door intermediate-size car. Referencing this information, the service provider may automatically reserve a similar vehicle, unless otherwise instructed by the MU.

In step 830 the AP 120 or a service provider transmits the rental car information to the designated rental car agency. The AP 120 may also determine the geographic location of the PCD 110 and provide this geographic location to the service provider or the rental car agency. In one embodiment, demographic data of the MU is also transmitted to the rental car agency. For example, the name, address, phone number, etc. may not have to be re-entered by the MU. Instead, this information may be read from the database of user information 325 and transmitted to the rental car agency either by the AP 120 or by another service provider connected to the network 130. In addition, if an appropriate rental car is found at the desired agency, the PCD 110 may be operable to transmit credit card information to the rental car agency through the AP 120.

In step 840 the designated rental car agency receives the information from the AP 120 and prepares for the arrival of the MU. If a MU did not specify a time to pick up the rental car, but the geographic information received from the AP 120 indicated that he was on the way to or at the airport, the service provider may be operable to compute an expected time of arrival as a function of the MU's current geographic location, the location of the rental car, current traffic conditions, etc. After the reservation is complete and the rental car is ready for pick-up the rental car agency may transmit a message to the MU's PCD indicating the state of preparedness. The rental car agency may also transmit data to the AP and/or the MU's PCD indicating the total cost, amount charged to credit card, scheduled return date/time, and any other information that is customary to provide.

In another embodiment, the MU has previously made the rental car reservation. Thus, in step 820 the PCD 110 of the mobile user transmits the previously made rental car reservation information to the access point. This may involve the PCD 110 transmitting the reservation ID number or other information which identifies the particular reservation of the mobile user. In step 830 the AP 120 transmits the rental car information to the designated rental car agency. The AP 120 also preferably transmits geographic information indicating the determined geographic location of the PCD 110. In step 840 the rental car agency receives the transmitted information from the AP 120, including the reservation identification and the known geographic location. Based on the known geographic location of the mobile user as provided by the AP, the rental car agency can optionally begin processing the rental car reservation based on the estimated time of arrival of the mobile user. For example, if the known geographic location information indicates that the mobile user has arrived in the destination airport, then the rental car agency can presume the user will be at the rental car counter within 20 minutes, and thus can begin processing the reservation to ensure that the reservation processing has been completed by the time the mobile user actually arrives at the rental car counter.

Figure 6B:
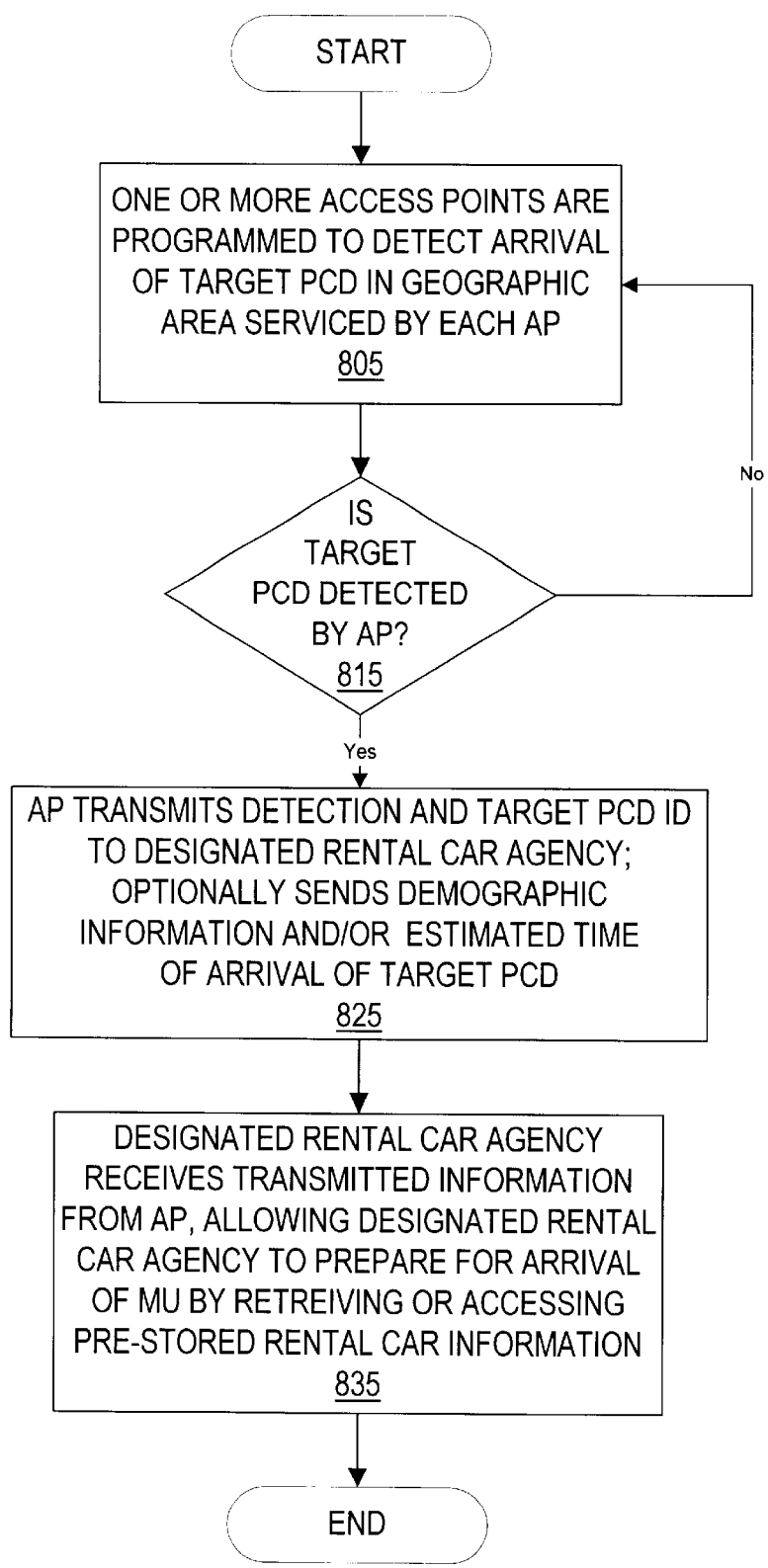
FIG. 6B is flowchart of an alternative embodiment of a method for reserving a rental car through a geographic based communication system.

FIG. 6B: Alternative Method for Placing Rental Car Reservations

The flowchart of FIG. 6B illustrates an alternative embodiment of a method of reserving or processing a rental car through a service provider (e.g., a rental car agency) through a geographic based communication system.

In step 805 one or more access points may be programmed to detect the arrival of a target MU's PCD in a geographic area serviced by each AP 120. In other words, certain MUs may generally require a rental car (or generally have previously made rental car reservations) when in the geographic proximity of a particular AP 120. For example, the San Diego, Calif. airport may have an AP 120 inside the airport near the arrival gate of one or more incoming flights. The AP 120 may be configured to recognize certain MUs (e.g., target PCDs being used by the MUs) that require a rental car on each visit to San Diego.

In step 815 the AP 120 detects a MU's PCD 110 that is on the list of target PCDs that require a rental car when in the geographic vicinity of the AP.

In step 825, the AP 120 transmits identification of the detected PCD 120 to the appropriate service provider or rental car agency. For example, the MU visiting San Diego may be using a PDA operable to establish a wireless communication with a wireless AP. As the MU walks in to the geographic proximity of the AP 120, a connection is made and the AP 120 determines that the MU requires a rental car. This may all be done without the MU removing the PDA from his suitcase. The AP may transmit information to the rental car agency indicating the current geographic location of the PCD 110 or MU and/or expected time of arrival at the rental car agency. The PCD 110 may also subsequently send information through the AP to the rental car agency regarding the rental car preferences and demographic data of the MU. Alternatively, the MU has previously made rental car reservations, and the PCD of the MU transmits a reservation ID to the AP 120, which may then be transmitted to the designated rental car agency along with geographic location information of the MU.

In step 835, the designated rental car agency receives the information from the AP and prepares the appropriate rental car. The rental car agency may charge a credit card on file for the MU or may receive credit card information from the database of user information 325B. The service provider may also calculate an expected time of arrival from the geographic location information provided by the AP 120.

In one embodiment, a service provider receives the identification of the PCDs and also may receive preference information from the PCDs. The service provider may then select rental car agencies for registered MUs based on this preference information. Where the MU has previously made rental car reservations, the rental car agency receives the reservation information and begins processing the reservation, possibly based on an ETA calculated from the known geographic location of the MU, so that the rental car is ready when the MU arrives.

Figure 7A:
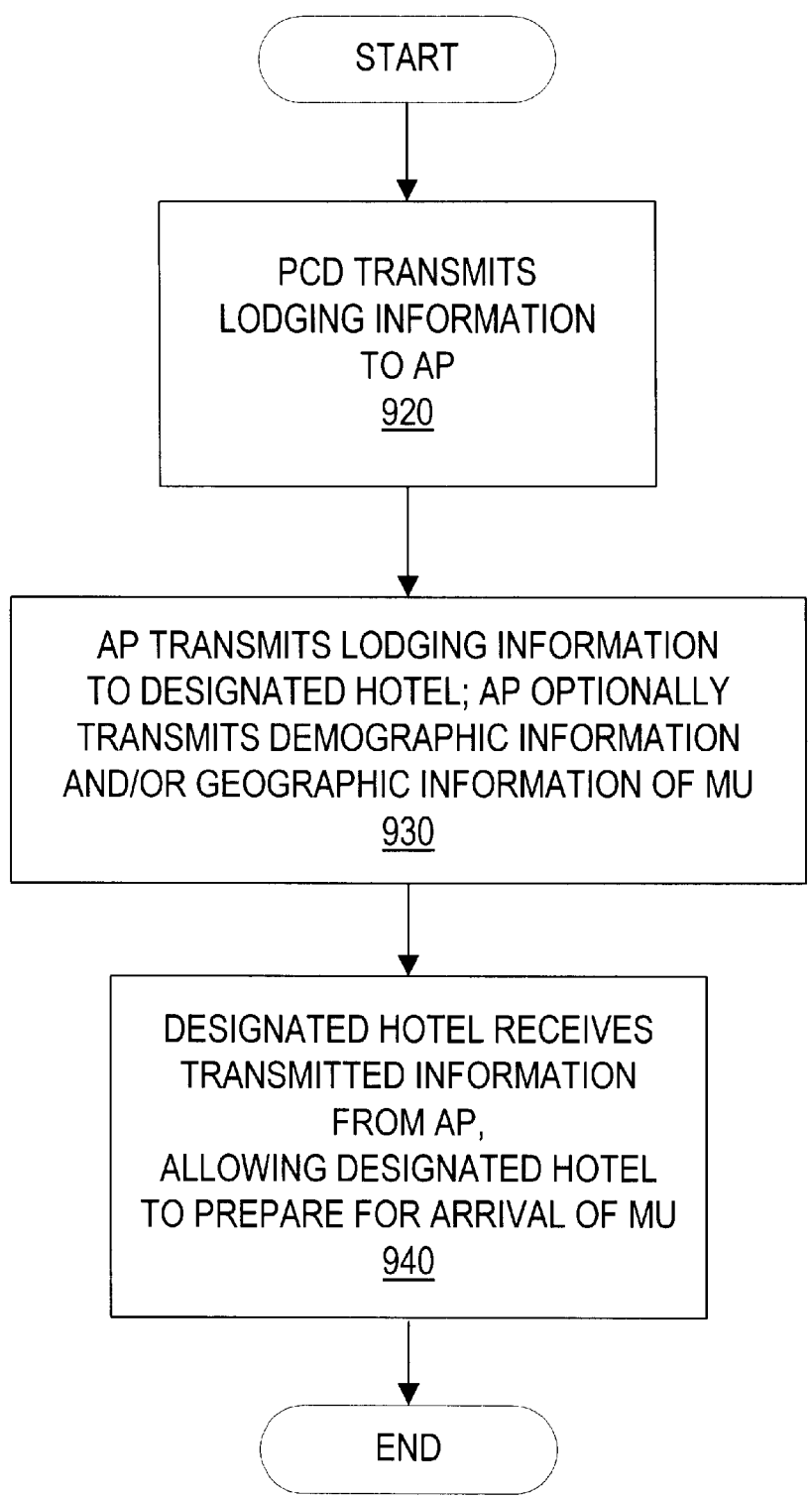
FIG. 7A is a flowchart of one embodiment of a method for placing hotel reservations through a geographic based communication system.

FIG. 7A: Method for Placing Hotel Reservations

The flowchart of FIG. 7A illustrates one embodiment of a method of placing or processing hotel reservations through a service provider (e.g., a hotel) in a geographic based communication system.

In step 920 the MU's PCD 110 transmits desired hotel reservation information through the AP 120. In one embodiment the MU has a preferred hotel company, room type, and amenities stored in the database of user information 325 and/or the service provider. Thus, in this embodiment, a MU's PCD 110 may only be required to transmit the location and duration of the desired hotel reservation to the AP 120.

In step 930 the AP 120 may transmit the desired hotel reservation information to the designated hotel. In one embodiment, the AP 120 may transmit the desired hotel reservation information to a service provider, where the service provider performs the function of selecting the designated hotel. For example, a MU is able to designate a specific hotel, but if a specific hotel is not designated, the service provider may be operable to select the hotel that most closely matches the preferences of the MU and/or the geographic proximity of the MU. The AP 120 may also determine the geographic location of the PCD 110 and provide this geographic location to the designated hotel or a service provider.

In one embodiment, the MU may also be operable to transmit the MU's demographic data through the AP to the designated hotel or service provider. Thus, for example, the name, address, phone number, etc. may not have to be re-entered by the MU when the MU arrives at the hotel. Alternatively, the hotel or service provider may read this information from the database of user information 325 through the network 130. In addition, if appropriate accommodations are found at the designated hotel, the MU may be operable to transmit credit card information to the hotel. The hotel or service provider may also be able to access this credit card information from a secure server in the network 130.

In step 940 the designated hotel receives the desired hotel reservation information from the AP 120 or from the service provider, makes the reservation, and prepares for the arrival of the MU. As noted above, the designated hotel may also receive the geographic location information to determine an approximate estimated time of arrival (ETA) of the MU. After the reservation is complete, the hotel may transmit a message to the MU's PCD 110 indicating the state of preparedness. The hotel may also transmit data to the AP 120 and/or the MU's PCD 110 indicating the total cost, amount charged to credit card, scheduled checkout date/time, and any other information that is customary to provide.

In another embodiment, the MU has previously made the hotel reservation. Thus, in step 920 the PCD 110 transmits the hotel reservation identification number or other lodging information which signifies the reservation to the AP 120. In step 930 the AP 120 transmits the lodging reservation information to the designated hotel where the reservation has been made. The access point also transmits known geographic location information indicating the determined geographic location of the PCD 110 of the mobile user. In step 940 the designated hotel receives the reservation information from the AP 120 as well as the geographic location information. This allows the designated hotel to determine the estimated time of arrival of the mobile user based on this geographic information, and optionally begin processing the hotel reservation so this processing is complete by the time the mobile user arrives at the hotel counter. The hotel may also access other information from the network 130, such as user's demographic information or preference and habit information, such as whether the user prefers a smoking or nonsmoking room, as well as credit card information to complete the transaction by the time the user arrives.

Figure 7B:
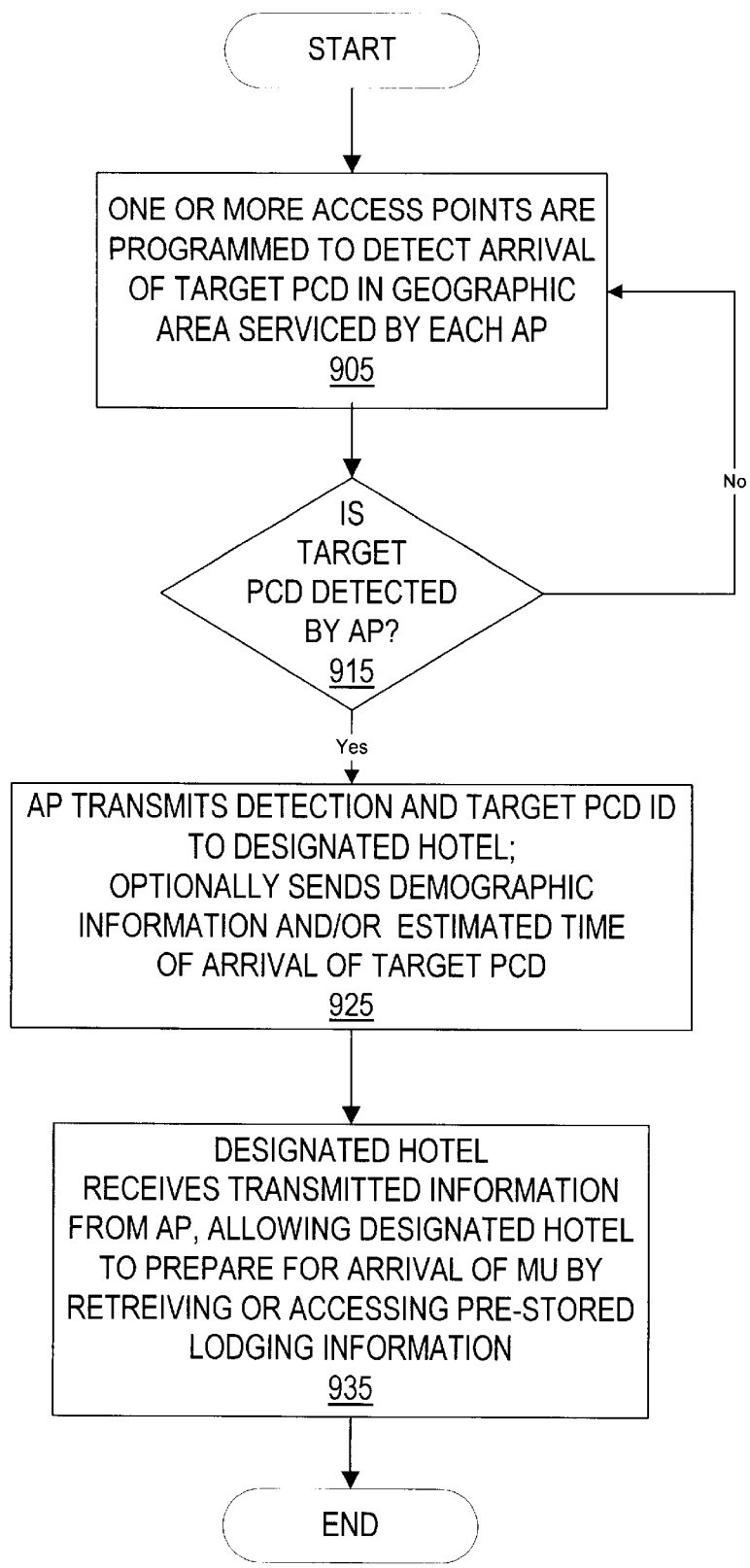
FIG. 7B is a flowchart of an alternative embodiment of a method for placing hotel reservations through a geographic based communication system.

FIG. 7B: Alternative Method for Placing Hotel Reservations

The flowchart of FIG. 7B illustrates an alternative embodiment of a method of placing or processing hotel reservations through a service provider that offers rooms for rent through a geographic based communication system.

In step 905 one or more access points 120 are programmed to detect the arrival of a target MU's PCD in a geographic area serviced by each AP 120. In other words, certain MUs may generally require a hotel reservation when in the geographic proximity of a particular AP 120. For example, the San Diego, California airport may have an AP 120 inside the airport near the arrival gate of one or more incoming flights. The AP 120 may be configured to recognize certain MUs (e.g., target PCDs being used by the MUs) that require (or may have previously placed) hotel reservations on each visit to San Diego.

In step 915 the AP detects a MU's PCD 110 that is on the list of target PCDs that require a hotel room when in the geographic vicinity of the AP 120.

In step 925 the AP may transmit the desired hotel reservation information to the appropriate hotel. In one embodiment, the AP 120 transmits the identification information of each respective MU to a service provider, wherein the service provider performs the function of selection and completing hotel reservations for each MU. Each MU may have a preferred hotel company, room type, and amenities stored in the database of user information 325B and/or at the service provider. Thus, in: this embodiment, a MU may only be required to transmit the location and duration of the desired hotel reservation through the AP 120 to the service provider 140. Alternatively, the MU has previously made hotel reservations, and the PCD 110 of the MU transmits a reservation ID to the AP 120, which may then be transmitted to the designated hotel along with geographic location information of the MU.

In step 935, the designated hotel receives the information from the AP and prepares (or confirms) the appropriate hotel reservations. The hotel may charge a credit card on file for the MU or may receive credit card information from the database of user information 325B. The hotel may perform other processing based on the received geographic location of the PCD 110 to ensure that the hotel is ready upon the user's arrival.

FIG. 8A: Method for Placing Travel Service Reservations

The flowchart of FIG. 8A illustrates one embodiment of a method of placing travel service reservations through a service provider 140 that offers travel services (e.g., airline, bus, train, taxi) in a geographic based communication system. The flowchart of FIG. 10A also illustrates a method for receiving updated travel information in a geographic based communication system.

In step 1010 the MU's PCD 110 transmits current or desired travel information to the AP 120. Where the MU desires reservations, the PCD 110 may transmit a reservation request to the AP 120. In one embodiment, the MU has a preferred airline, seat type, and amenities stored in the database of user information 325B and/or the service provider. Thus, in this embodiment, a MU's PCD 110 is required only to transmit the departure location, the arrival location, and the date/time of travel of the airline reservation to the AP. Where the MU already has reservations, the PCD 110 may transmit current travel information to the AP 120.

In step 1020 the AP 120 transmits the current or desired travel information to the designated travel service provider. Where the MU desires reservations, the MU is able to designate a specific airline, but if a specific airline is not designated, the service provider may be operable to select the airline that most closely matches the preferences of the MU and the geographic proximity of the MU.

In step 1030 the AP 120 may determine the geographic location of the PCD 110 and transmit the geographic location to the travel service provider. In step 1030 the AP 120 may also be operable to transmit demographic data of the MU to the designated airline. For example, the name, address, phone number, etc. may not have to be reentered by the MU. Instead, this information is received from the AP 120 or read from the database of user information 325 and transmitted to the designated airline. In addition, if appropriate accommodations are found at the designated airline, the AP may be operable to transmit credit card information to the airline.

In step 1040 the designated airline receives the current or desired travel information from the AP 120, including the geographic information of the PCD 110 and possibly the demographic data of the user.

In step 1045 the designated airline prepares for the arrival of the MU. Where the MU desires reservations, the designated airline may make the appropriate reservation. This may include retrieving information from a database based on the target PCD's ID. Where the MU already has reservations, the designated airline or another service provider may obtain updated travel information relevant to the user, based on the user's current itinerary and/or the known geographic location of the MU.

In step 1050 the airline may transmit a message to the AP and/or the MU's PCD indicating the details of the reservation. The airline may also transmit data to the AP and/or the MU's PCD indicating the total cost, amount charged to credit card, scheduled flight dates/times, and any other information that is customary to provide. Where the MU already has reservations, the designated airline or another service provider may provide the updated travel information relevant to the user.

Figure 8B:
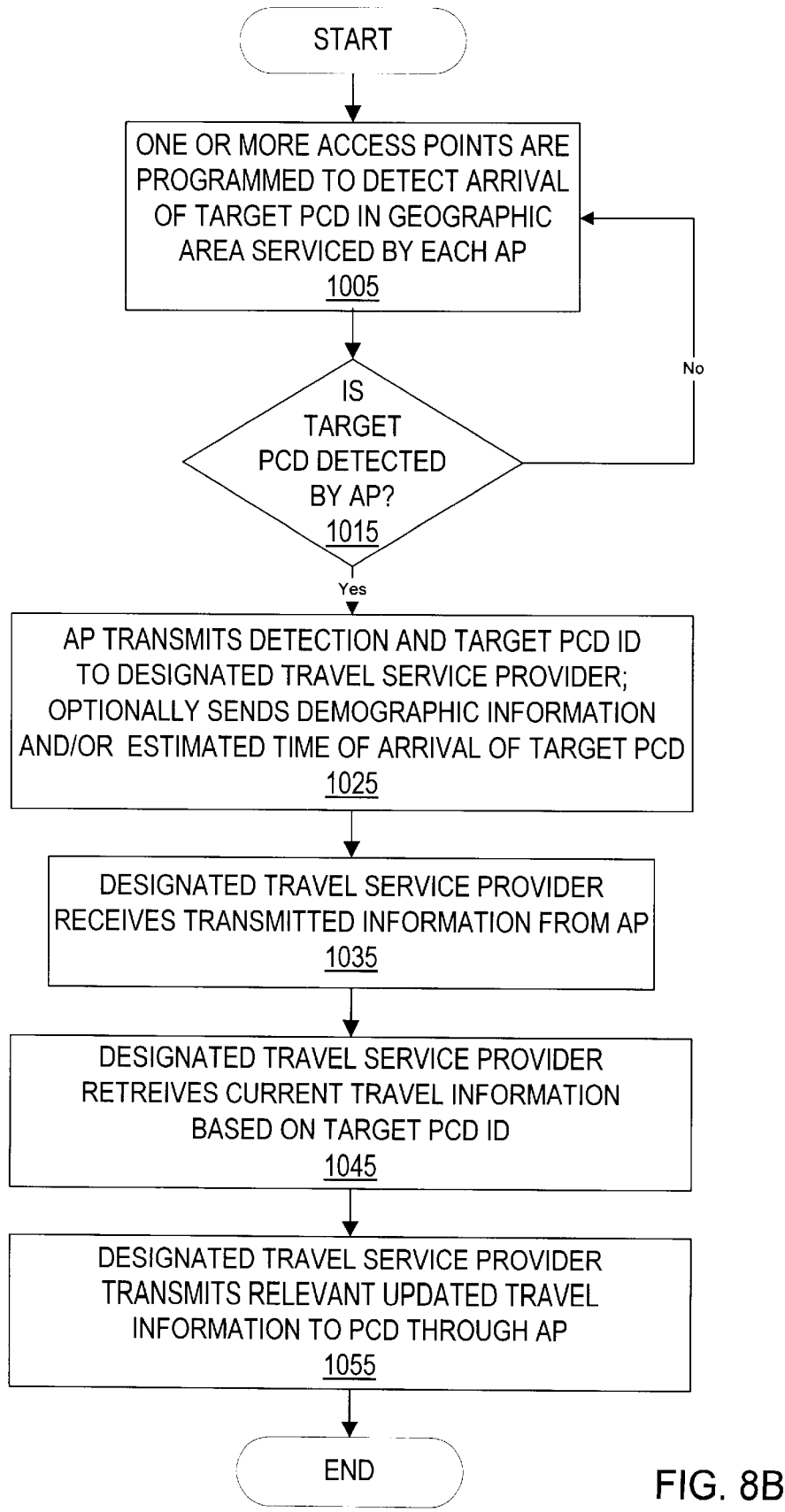
FIG. 8B is a flowchart of an alternative embodiment of a method for reserving travel services through a geographic based communication system.

FIG. 8B: Alternative Method for Placing Travel Service Reservations

The flowchart of FIG. 8B illustrates an alternative embodiment of a method of placing travel service reservations through a service provider that offers travel services (e.g., airline, bus, train, taxi) through a geographic based communication system. The flowchart of FIG. 10B also illustrates a method for receiving updated travel information in a geographic based communication system.

In step 1005 one or more access points 120 are programmed to detect the arrival of a target MU's PCD in a geographic area serviced by each AP. In other words, certain MUs may generally require a taxi when in the geographic proximity of a particular AP. For example, the San Diego, Calif. airport may have an AP inside the airport near the arrival gate of an incoming flight from Austin, Tex. The AP 120 may be configured to recognize certain MUs (e.g., target PCDs being used by the MUs) that require a taxi to transport the MU from the airport to their hotel on each visit to San Diego.

In step 1015 the AP 120 detects a MU's PCD that is on the list of target PCDs that require a taxi when in the geographic vicinity of the AP.

In step 1025 the AP 120 transmits information to the appropriate taxi service, possibly including the determined geographic location of the PCD 110. In one embodiment the MU has a preferred taxi service and amenities stored in the database of user information 325 and/or at the service provider. Thus, in this embodiment, the AP 120 may only transmit the determined location of the MU (for pickup by the taxi service) and the requested destination to the taxi service provider.

In step 1035 the designated taxi service receives the information from the AP. In step 1045, the designated taxi service retrieves current travel information based on the PCD's ID, and dispatches a taxi to the location of the MU.

In step 1055 the designated taxi service may send a message to the MU's PCD indicating the estimated time of arrival of the taxi at the location of the MU, and identifying information about the taxi (e.g., color, license number).

Figure 10A:
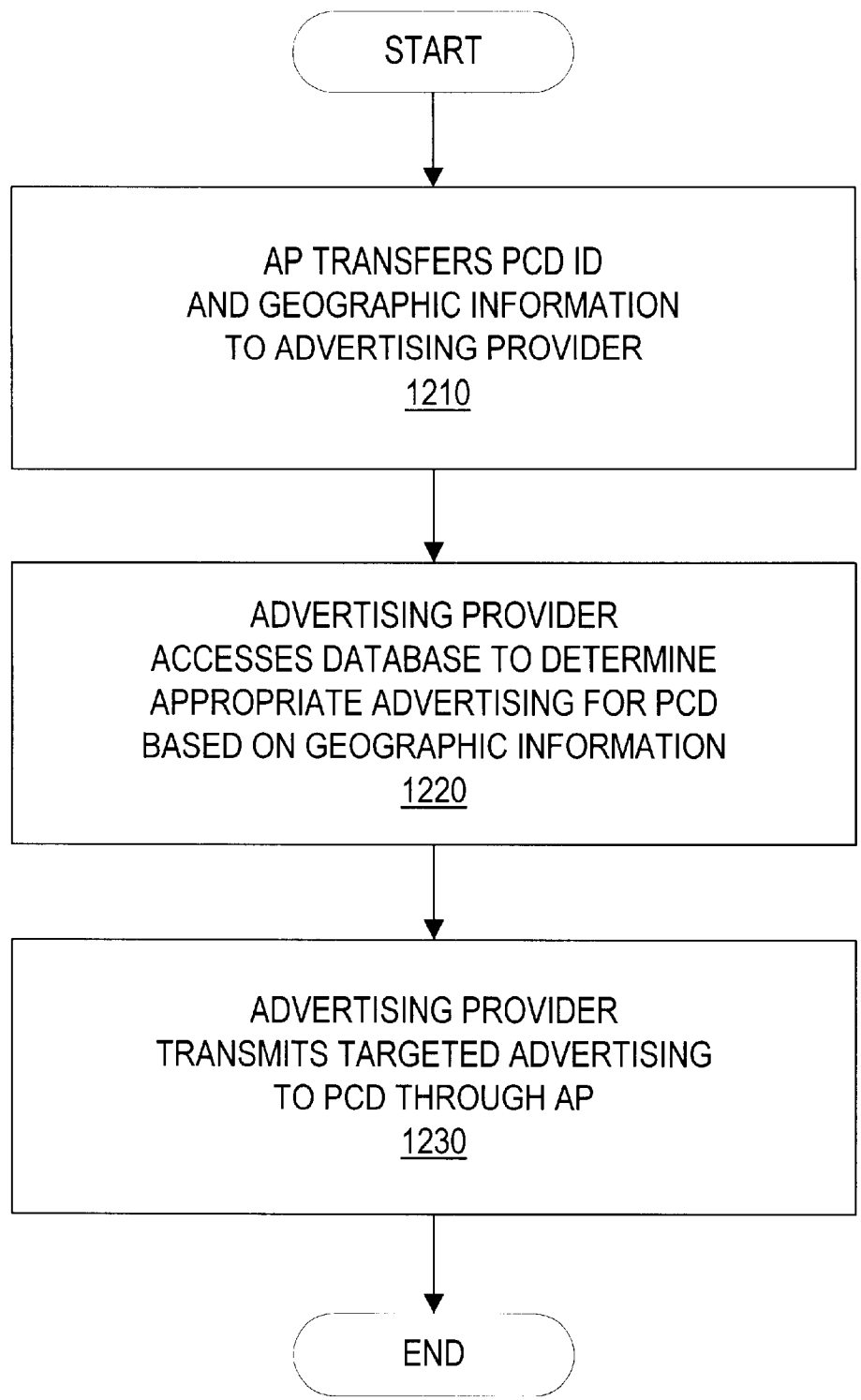
FIG. 10A is a flowchart of one embodiment of a method for providing targeted advertising through a geographic based communication system.
Figure 10B:
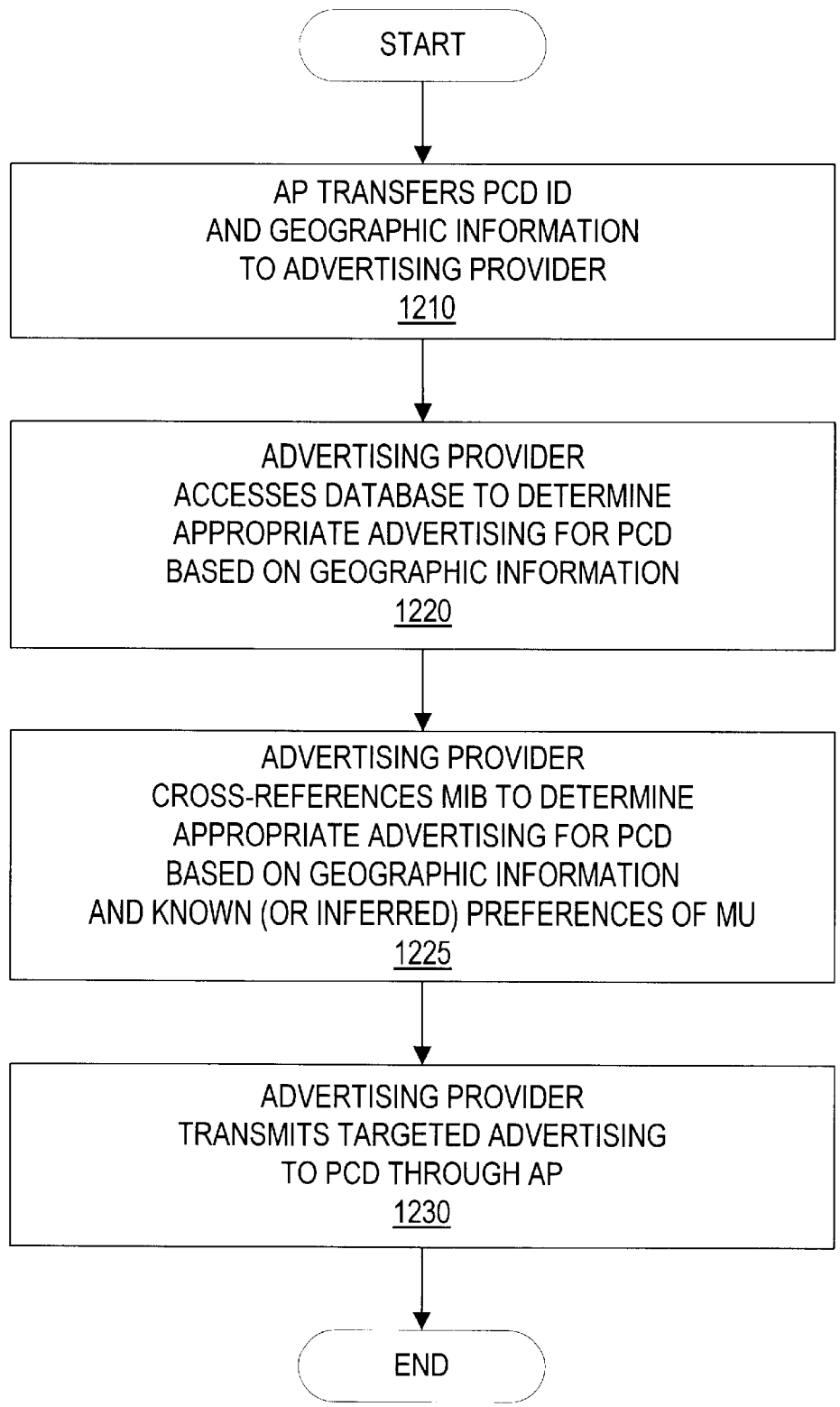
FIG. 10B is a flowchart of an alternative embodiment of a method for providing targeted advertising through a geographic based communication system.

The above method in flowchart of FIG. 10B may also be used for receiving updated travel information in a geographic based communication system as described above.

Figure 9:
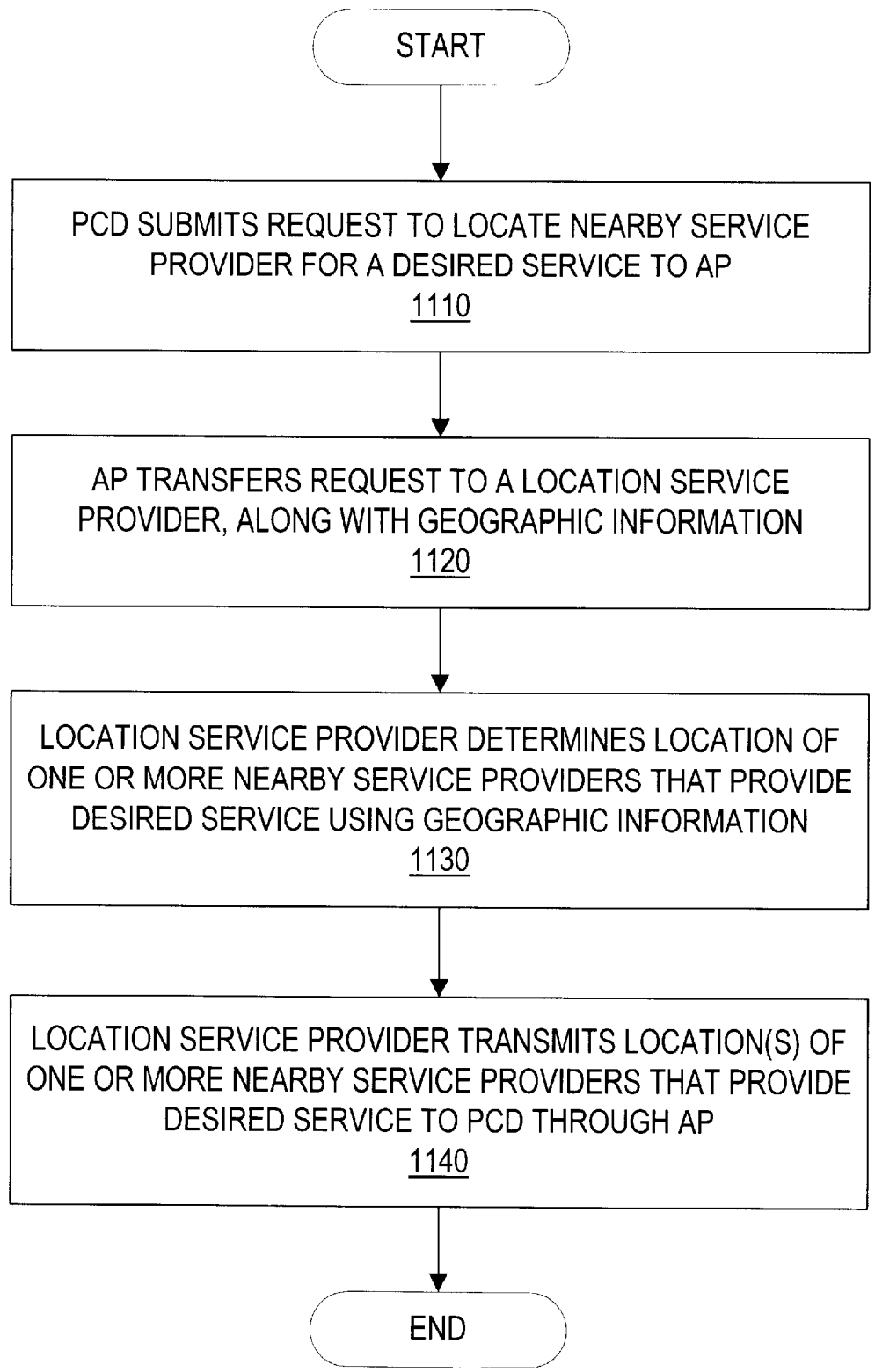
FIG. 9 is a flowchart of one embodiment of a method for locating the nearest service provider through a geographic based communication system.

FIG. 9: Method for Locating the Nearest Service Provider

The flowchart of FIG. 9 illustrates one embodiment of a method for locating the nearest service provider that offers a particular service (e.g., car rental agencies, hotels, restaurants, airline reservation centers, banks, department stores, malls, specialty shops, gift shops, convenience stores, taxi services, bus and train reservation offices, printing services, on-line database services, message services, E-mail services) through a geographic based communication system.

In step 1110 the MU's PCD 110 submits a request to locate a service provider, e.g., restaurants, in the immediate vicinity of the MU to the AP 120. In one embodiment the MU has certain preferences, e.g., a preferred food style (e.g., barbecue), restaurant style (e.g., fast food or table service), and amenities stored in the database of user information 325B and/or the service provider. Thus, in this embodiment, a MU's PCD 110 is required only to transmit the request to locate restaurants to the AP.

As another example, the MU's PCD 110 may direct an inquiry through the access point 12 over the network 130 connected to the user's bank to locate the nearest ATM in the immediate vicinity of the MU. Since the MU's location is established with relative precision by the location of the access point 120, the service provider may respond with a message such as "Straight ahead to exit 3, turn right and proceed two blocks."

In step 1120, the AP 120 transfers the request to locate a nearby service provider, e.g., restaurants offering the food style and restaurant style preferred by the MU, to a location service provider, along with the determined geographic location of the PCD 110. The location service provider may be the AP 120 or a separate service provider 140 connected to the network 130. If the desired service provider is not available in the immediate vicinity, the location service provider may suggest alternates based on the known geographic location which most closely match the user's preferences. For example, if a food style and/or restaurant style preferred by the MU is not available in the immediate vicinity of the PCD 110, the location service provider may be operable to select alternative restaurants that most closely match the preferences of the MU and the geographic proximity of the MU.

In step 1130 the location service provider determines the location of any nearby providers, e.g., any restaurants offering the food style and restaurant style preferred by the MU, and/or alternative service providers that most closely match the preferences of the MU and the geographic proximity of the MU.

For example a mobile user of PCD 110 who connects to an access point 120 in a hotel lobby (e.g., through an infra-red port) may quickly receive information regarding restaurants, shops, services, etc. available in the immediate area. This information may include, for example, hotel room prices, shuttle service schedules, restaurant locations, menus, specials of the day, area event schedules, availability, and prices.

In step 1140 the location service provider may transmit a message to the AP 120 and/or the MU's PCD indicating the locations of the providers, e.g., restaurants, found in step 1130, along with their names, food styles, restaurant styles, and any information available on the restaurants (e.g., specials, menus, credit cards accepted).

Because each access point 120 contains a specific geographic location and is able to determine the approximate location of the PCD 110, the PCD 110 may receive information that is different based on the determined geographic location of the PCD 110. In a hotel that includes several fast food restaurants, the nearest fast food restaurant may be different depending on the location of the PCD 110 and APs within the hotel. The specific geographic pinpointing feature also allows competitors to produce real-time competitive advertising.

For example, if a mobile user of PCD 110 is looking for a restaurant and is 10 yards from restaurant A and 100 yards from restaurant B, restaurant B may transmit an advertisement to PCD 110 that gives the mobile user of PCD 110 a discount for walking a few minutes to come to restaurant B. In a similar manner, a department store may transmit a "digital coupon" offering a discount to the next 5 customers who mention the digital ad. The digital coupon may be transmitted to all MUs in the geographic proximity, or may be transmitted only to MUs who have spent a certain amount of money in the respective store. The digital coupon may be transmitted to only MUs who are inside or immediately outside the respective store, or alternatively, the digital coupon may be sent to MUs that are in the geometric proximity of all APs in the mall or near the mall entrances.

In addition, a digital coupon that is limited to a certain quantity of buyers (e.g., the first five customers that show the digital coupon) may be reserved or used immediately by a MU transmitting a signal back to the service provider indicating they would like to purchase the product and sending demographic and payment information. For example, a mobile user of PCD 110 has just entered a mall and received a digital coupon from Toys 'R' Us that states, "Next 3 customers to purchase a Nintendo 64 entertainment system pay only $29.99." If Toys 'R' Us is on the opposite side of the mall, and if the mobile user of PCD 110 wants to take advantage of this limited ad, the mobile user of PCD 110 may be able to instantly respond with credit card information to complete the discounted sale.

FIG. 10A: Method for Providing Targeted Advertising

The flowchart of FIG. 10A illustrates one embodiment of a method for providing targeted advertising through a service provider that offers advertising through a geographic based communication system. The targeted advertising may be based at least partly on the known geographic location of the MU as determined by an AP 120 (or as provided by GPS information by the PCD of the MU), and also possibly based on demographic information of the user.

In step 1210 the access point 120 detects a PCD 110 of a MU and transmits the PCD's ID and determined geographic information of the PCD 110 to an advertising provider.

In step 1220 the advertising provider may access a database, such as the advertising provider's proprietary databases, to determine appropriate advertising to be sent to the MU's PCD 110, based on the determined geographic location of the PCD 110. Thus the advertising may be selected based on the known geographic location of the user. The advertising may also be selected based on the known geographic location of the user as well as demographic information of the user, such as past purchases, spending habits, etc.

In step 1230 the targeted advertising that is chosen for the MU by the advertising provider is transmitted to the MU's PCD 110 through the AP 120. This targeted advertising may be time-sensitive, or quantity-sensitive, or unrestricted. An example of a time-sensitive advertisement is: "For the next 15 minutes, all watches are 25% off at ABC Watch Company, which is located in the A concourse, between gates 14 and 16." An example of a quantity-sensitive advertisement is: "The next 50 customers who request a submarine sandwich at DEF Restaurant will receive a free drink. The DEF Restaurant is located in the C concourse, between gates 23 and 25."

As a further example, a McDonalds franchise may be looking for a new store location in a city or a new store location within an airport or hotel. The McDonalds franchise may be interested in demographic data for different areas of the region of interest. This data may include demographic charts taken every hour, for example, which show the number, sex, ages, etc. of MUs at each access point at the different times. This demographic data may be compiled and presented in a variety of graphic formats. The information provider may also query the MUs that communicate with a specific access point (or all access points), asking each MU, "would you buy a BIG MAC right now if McDonalds was less than 3 blocks away?" This information may be compiled by the information provider and sold to McDonalds to aid in the determination of the best store location. MUs that answer such surveys may be rewarded with a digital coupon that allows them to buy BIG MACs for $0.99 for the next six months. MUs may also have the option to configure their PCDs to not accept unsolicited surveys.

FIG. 10B: Alternative Method for Providing Targeted Advertising

The flowchart of FIG. 10B illustrates an alternative embodiment of a method for providing targeted advertising through a service provider that offers advertising through a geographic based communication system. As with the method in FIG. 12A, the targeted advertising may be based at least partly on the known geographic location of the MU as determined by an AP 120 (or as provided by GPS information by the PCD of the MU), and also possibly based on demographic information of the user.

In step 1210 the AP the access point 120 detects a PCD 110 of a MU and transmits the PCD's ID and determined geographic information of the PCD 110 to an advertising provider. In one embodiment, demographic information on the MU's past purchases from the clients of the advertising provider may be stored in the database of user information 325 and/or the advertising provider. Certain demographic information may also be provided by the PCD 110 of the MU. Thus, in this embodiment, even if the MU has not visited any of the specific clients of the advertising provider near the location of the AP 120, the advertising provider may be able to provide suggestions of service providers in the area based on the past purchases of the MU as well as the geographic location information. The advertising provider may then send advertisements from service providers to which the MU is likely to respond (e.g., targeted advertising).

In step 1220 the advertising provider accesses the advertising provider's own proprietary databases to determine appropriate advertising to be sent to the MU's PCD, based on the geographic location of the AP.

In step 1225 the advertising provider additionally accesses the database of user demographic information 325 and/or the advertising provider's own proprietary databases to determine appropriate advertising to be sent to the MU's PCD, based on the location of the AP along with the preferences, habits or other demographic information of the MU. For example, using the known restaurant preferences of the MU, the advertising provider may extrapolate desired food styles (e.g., oriental) and/or restaurant styles (e.g., cafeteria) that may be of interest to the MU.

In step 1230 the targeted advertising may be selected based on one or more of the known geographic location of the MU and the demographic information of the MU. The targeted advertising that is chosen for the MU by the advertising provider is transmitted to the MU's PCD through the AP. This targeted advertising may be time-sensitive, or quantity-sensitive, or unrestricted. An example of a time-sensitive advertisement is: "For the next 15 minutes, all watches are 25% off at ABC Watch Company, which is located in the A concourse, between gates 14 and 16." An example of a quantity-sensitive advertisement is: "The next 50 customers who request a submarine sandwich at DEF Restaurant will receive a free drink. The DEF Restaurant is located in the C concourse, between gates 23 and 25."

As a further example, a service provider 140 (e.g., an arcade in a mall) may request information about visitors (MUs) that is carrying a PDA (PCD 110) operable to communicate with an AP 120 in the mall entrance. As the visitor enters the mall, his PDA automatically connects to the AP 120. The arcade, along with other information and service providers coupled to network 130, is notified that the visitor is in the mall and is given the position of the visitor (the location of the PCD 110). The approximate geographic location of the visitor is determined by the access point 120 as described above.

In addition, there may be several different access points throughout the mall that track the visitor's movement through the mall. The service provider may desire to know certain demographic information, e.g., the age and sex, of each visitor that enters the mall in order to determine if a particular advertisement should be sent. The service provider may not desire to send advertisements to each visitor because royalties may be paid to the AP provider for each advertisement sent. The request for information about the visitor may be sent to processor 310 via network 130 and network interface 340. The processor 310 may then determine the desired demographic information, e.g., the age and sex of the visitor, stored in the database of user information 325 and read the appropriate information from memory 320 according to the database of user information 325. This information is then made available to the service provider through network interface 340 and network 130.

Alternatively, if the information requested from the service provider is not stored locally in the MIB 150, the processor 310 may send out a request to a specific information provider 140 requesting the specific information. Processor 310 may also store in memory billing information corresponding to each information and service provider 140 that requests information.

In a similar example, if the service provider is requesting specific details about the visitor, such as purchase habits for shoe apparel, the database of user information 325B may not contain information that specific. The processor 310 may determine, though, that there is an information provider 140 that stores this type of specific data, e.g., the purchase habits for shoe apparel. Processor 310 may then send a message to the service provider indicating that an information provider 140 is available that contains the specific information requested, along with the price of that information., The service provider may then agree to pay the fee to access the specialized information provider.

Figure 11:
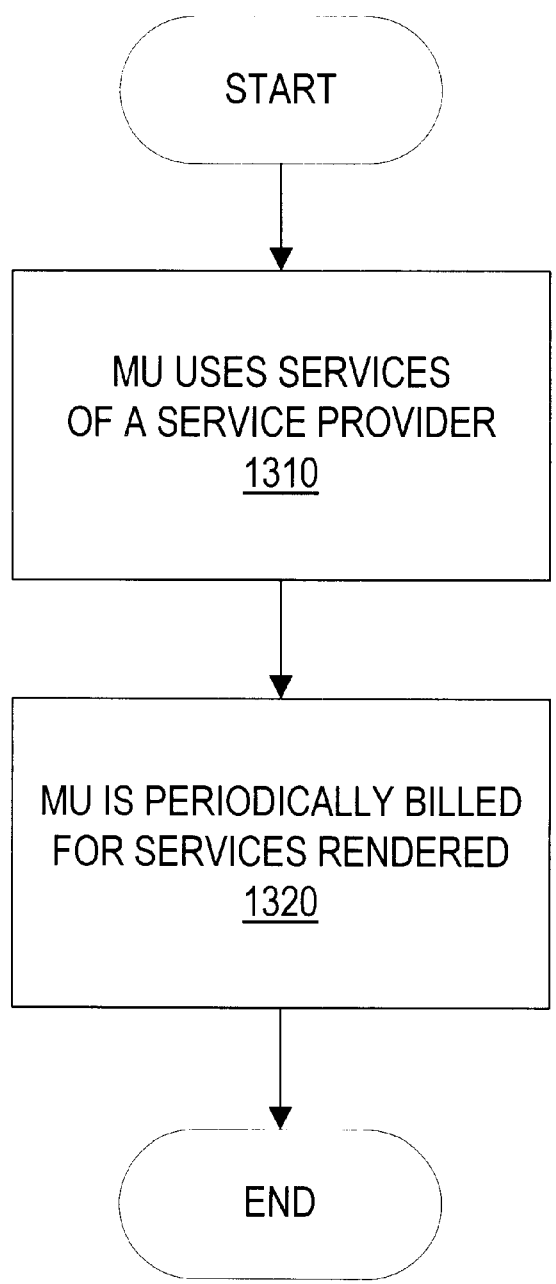
FIG. 11 is a flowchart of one embodiment of a method for providing geographic based billing through a geographic based communication system.

FIG. 11: Method for Geographic Based Billing

The flowchart of FIG. 11 illustrates one embodiment of a method for providing geographic based billing through a geographic based communication system.

In step 1310, the MU (using their PCD) accesses one or more service providers 140 and uses one or more services over a given period of time (e.g., daily, monthly, quarterly, yearly). Here it presumed that the PCD of the MU has previously connected to an AP 120 and accesses one or more service providers 140 on the network 130.

In step 1320 the billing information from all service providers 140 may be stored, such as in the database of user information 325. The MU may pay only one bill over a given period of time (e.g. a month) to the network system operator and the system operator owner may pay the charges to individual service providers 140. Alternatively, each service provider may be directly paid by the MU, either through a credit card or any other method of payment, at the time services are rendered.

The billing rate for a particular service may be different according to the geographic location of the MU. For example, a MU that receives a fax in a hotel conference room may pay a higher rate than if the fax were received in a print shop. This allows fluctuations in market costs of information and services according to geographic location. For example, the cost of living may be much higher in San Francisco than it is in Austin. Most products and services cost more if they are purchased in San Francisco, in comparison to Austin prices. The present invention allows :a goods, information, and/or service provider, who provides the same service in both San Francisco and Austin, to charge different amounts for the goods, information, and/or services dependent upon the location where the service is provided.

Figure 12:
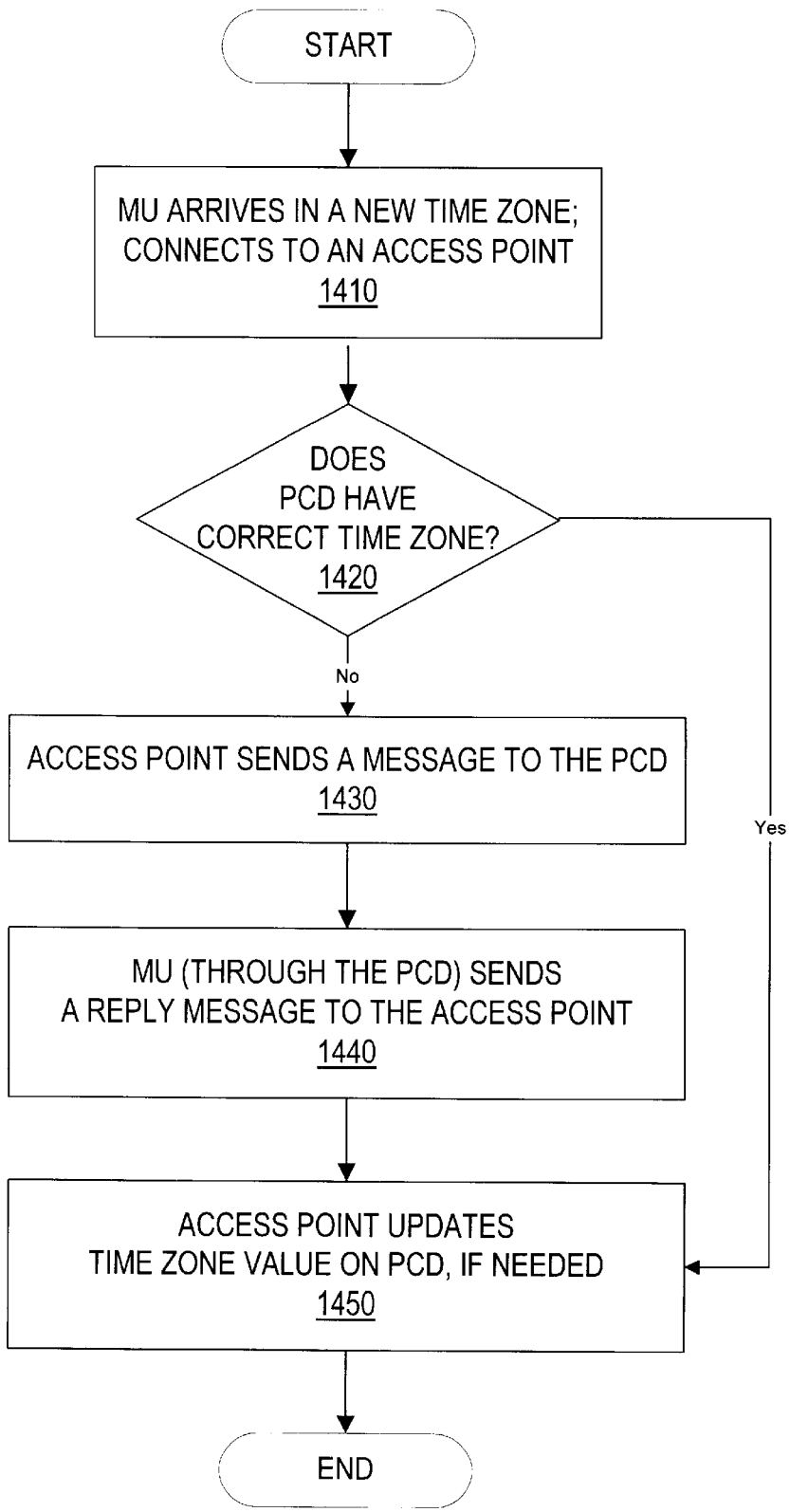
FIG. 12 is a flowchart of one embodiment of a method for automatically adjusting a PCD to the current time zone through a geographic based communication system.

FIG. 12: Method for Automatically Adjusting to Current Time Zone

The flowchart of FIG. 12 illustrates one embodiment of a method for automatically adjusting a PCD to the current time zone through a geographic based communication system.

In step 1410 a MU arrives in a new time zone and connects to the network via an access point. For example, the MU may have just arrived at an airport, or driven into a new time zone in an automobile.

In step 1420 the access point compares its stored local time zone with the local time zone of the MU's PCD. The local time zone for each access point 120 may be stored either in the MIB 150 or directly in the access point 120.

In step 1430 the access point sends a message to the MU's PCD 110 indicating that the local time zone is different from the time zone currently being used on the MU's PCD 110 and may await a reply before changing the time zone.

In step 1440, the MU has indicated (by replying to the message sent in step 1430) that he would like the time zone updated. The access point 120 then may update the time zone on the PCD 110 to the local time zone.

Step 1450 is reached by either the MU not replying to the message sent in step 1430 within a user-specified time-out period (e.g., 60 minutes), or the MU replying to that message, and the access point completing the time zone update on the PCD.

Service Provider as an Infomediary

In one embodiment, the network provider or a service provider acts as an infomediary for the mobile users or subscribers. In other words, the network provider may maintain information regarding the mobile user from a database, or received from the mobile user, and selectively provide this information to information or service providers on the network. The network provider or service provider may selectively provide this information at the direction of the mobile user, possibly for the financial benefit of the mobile user.

FIGS. 13A and 13B: Access Points and Geographic Regions

FIGS. 13A and 13B each illustrate a plurality of wireless access points 120 and their respective geographic detection regions 500. Wireless access points 120 may be similar to those described in reference to FIG. 1. Each wireless access point 120 may include a transmitter and a receiver for sending and receiving wireless signals, thus enabling a PCD 110 to establish a connection to a network. A wireless access point may have a geographic detection region 500 within which it may communicate with a PCD 110. The radius of detection region 500 may vary based upon several factors. One such factor may be the sensitivity of receiver circuitry in both PCD 110 and wireless access point 120. A second factor may be the available power for transmitting signals and/or data packets by both PCD 110 and wireless access point 120.

Wireless access points 120 may be configured to determine the location of a PCD 110 within a second geographic region 501, i.e., with a granularity as indicated by region 501. The smaller second geographic region 501 where the PCD 110 is determined to be located represents a more precise location of PCD 110.

FIG. 13A illustrates an embodiment where the PCD 110 determines an approximate location of the PCD 110 using both distance and bearing information. Thus, in FIG. 13A, second geographic region 501 may be a smaller region at a certain bearing and distance relative to the AP 120. Second geographic region 501 may have a significantly smaller radius (e.g. approximately 10 feet) than geographic detection region 500.

FIG. 13B illustrates an embodiment where the PCD 110 determines an approximate location of the PCD 110 using only distance information. Thus, in FIG. 13B, second geographic region 501 may be a concentric ring region centered around the AP 120.

Wireless access points 120 may employ various techniques to determine the location of PCD 110. These techniques may include, but are not limited to, one or more of signal strength measurement, signal travel time measurement, bearing determination, and triangulation. Location circuitry 211 (such as that illustrated in FIG. 2) within each wireless access point 120 may be configured to perform one or more of these techniques.

As discussed above, other information may then be used regarding the geography of the area to further determine an approximate location of the PCD 110. For example, the AP 120 can presume that the user is not located on the airport tarmac or in a "forbidden area" of the airport, and hence the AP 120 can further "narrow down" the locations where the user of the PCD 110 might be. Thus the AP 120 can use the approximate distance and/or bearing information in conjunction with map information of the area to determine or refine possible locations of the PCD 110.

After determining an approximate location, wireless access point 120 may transmit a data packet including the location information to PCD 110, thereby informing a user of his approximate or exact location. The location information determined by wireless access points may be useful for both a user of PCD 110 and a network service provider. For example, a user of PCD 110 may be able to query a network service provider for directions to the nearest automatic teller machine (ATM), a restroom facility, or a specific business. Furthermore, wireless access points 120 may be configured to make multiple readings of the location of PCD 110 in order to determine a direction of motion. This may be useful in providing feedback to a user of PCD 110 making a transit based on the directions provided due to the query.

Various network service providers and associated sponsors may also use the location information, along with demographic information of the user of PCD 110, to tailor the content provided to the PCD 110. In one example, a user of PCD 110 is located in an airport terminal, near a specific restaurant in which he has eaten on previous layovers in the same terminal. The restaurant is a sponsor for a network service provider. A nearby wireless access point 120 determines that the user of PCD 110 is located near the restaurant. After wireless access point 120 transmits the location information to the network, a network service provider may determine that the user of PCD 110 has patronized the specific restaurant from previously gathered demographic information. In response, the network service provider may transmit information about a promotion by the restaurant. Many other similar scenarios are possible, and thus, the above scenario is provided by way of example and is not limiting.

Figure 14A:
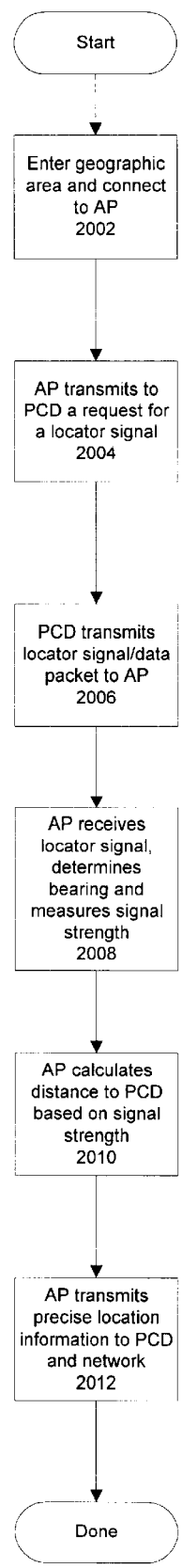
FIG. 14A is a flowchart illustrating the operation of one embodiment of an access point configured to determine the location of an MU based on a bearing determination and a signal strength measurement.

FIG. 14A: Flowchart of a Method for Determining Location Using Signal Strength

FIG. 14A is a flowchart of one embodiment of a method of determining the location of a PCD 110 using a wireless access point 120 configured to determine the bearing and signal strength of an incoming signal. The method begins when a mobile user carries a PCD 10 into a geographic region near an access point (AP) and establishes a wireless connection with the AP (Step 2002). In some embodiments, a PCD 110 may periodically transmit an "alert" signal in order to indicate its presence to any nearby AP's. In other embodiments, a user of a PCD might submit a request to establish communications with any nearby AP by transmitting an alert signal.

Following the establishment of communications between the AP 120 and the PCD 110, the AP 120 may then transmit a request for a locator signal to the PCD (Step 2004). In response, the PCD 110 may transmit a locator signal to the AP (Step 2006). In some embodiments, the locator signal may include a data packet. The data packet may include pertinent information, such as the time of transmission of the locator signal, as well as the power level of the signal at the source.

In Step 2008, the AP 120 receives the locator signal. Upon receiving the locator signal, the AP 120 may be configured to make an immediate determination of the bearing from which the signal originated. Location circuitry within the AP 120 (as previously discussed) may include a memory which stores the bearing information. The location circuitry may also perform a signal strength measurement of the received signal. Using the transmit power information included in the data packet, the location circuitry may then determine the attenuation of the locator signal by calculating the difference between the signal strength at the source and receiver.

With the attenuation of the signal calculated, the location circuitry may then determine the distance between the AP 120 and the PCD 110: (Step 2010). Having determined the bearing (relative to the AP 120) and the distance to the PCD, the AP 120 has the necessary information for an approximate or precise location determination. After determining the precise location, the AP 120 may transmit the location information to both the PCD and to the network (Step 2012).

Figure 14B:
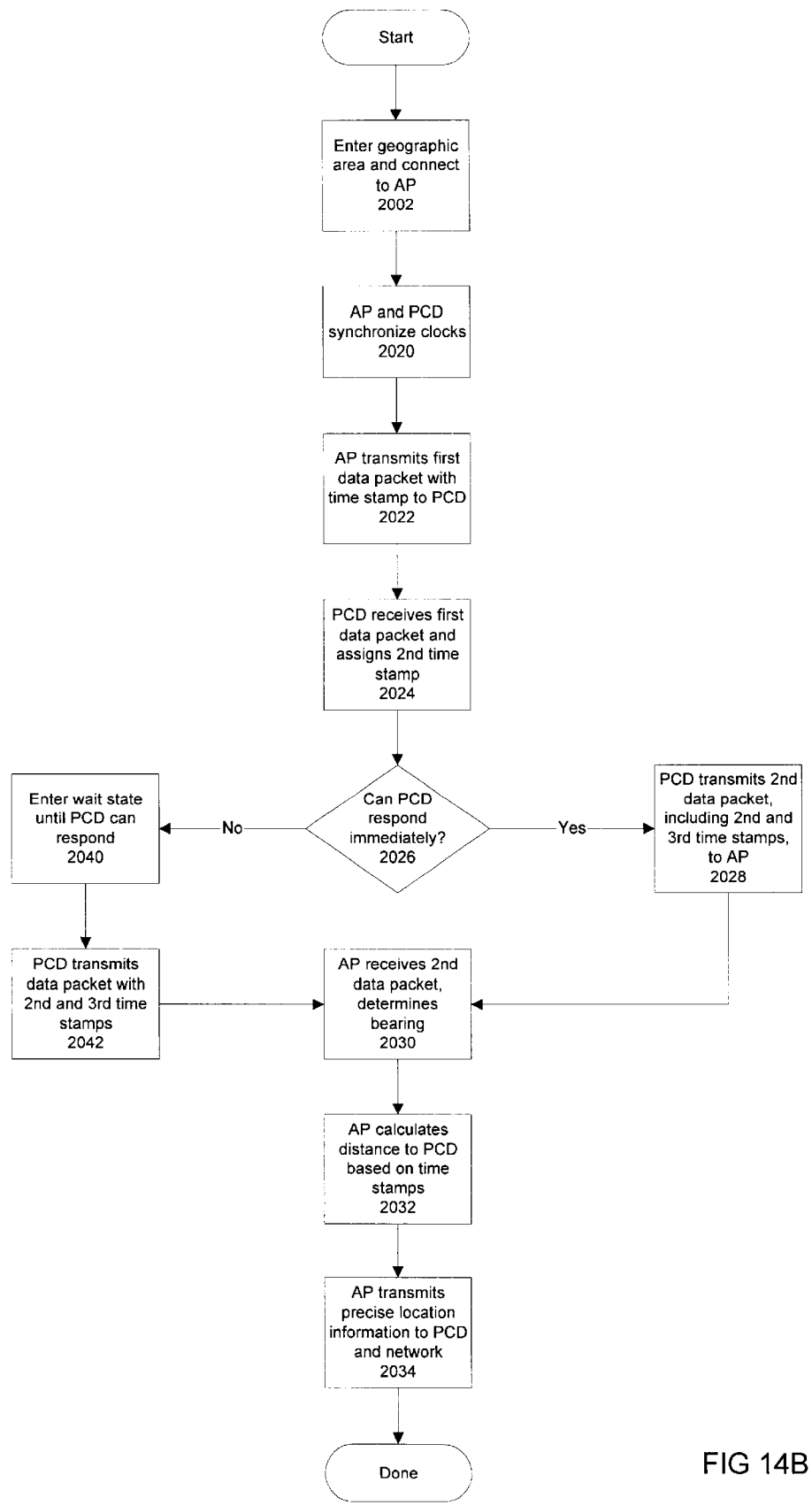
FIG. 14B is a flowchart illustrating the operation of one embodiment of an access point configured to determine the location of an MU based on a bearing determination and a measurement of signal travel time.

FIG. 14B: Flowchart of a Method of Determining PCD Location Using Time Stamps

FIG. 14B is a flowchart of one embodiment of a method for determining the precise location of a PCD 110 using time stamps. Using this method, an AP 120 may determine the distance to a PCD 110 base on the amount of time it takes for a signal to travel between the AP 120 and the PCD 110. The method begins when a mobile user carries a PCD 110 into a geographic region covered by an AP (Step 2002). The PCD 110 may establish a wireless connection to the AP in a manner similar to that of the method in FIG. 14A. After a connection has been established, the AP and the PCD may then synchronize clocks (Step 2020), which may be performed to ensure that signal travel time may be accurately determined.

Following the synchronization of clocks, the AP 120 may then transmit a first data packet to the PCD 110 (Step 2022). The first data packet may include a firs time stamp indicating the exact time of the transmission. Upon receiving the data packet, the PCD may assign a second time stamp indicating the exact time of receiving the data packet.

In Step 2026, a determination is made as to whether the PCD may respond immediately to receiving the first data packet by transmitting a second data packet. In some cases, the PCD 110 may be performing multiple tasks, and have a heavy processing load. Similarly, in times of heavy network traffic, an AP may not be able to accept an immediate response. Since a delay of even a fraction of a second can have a profound effect on a distance calculation based on signal travel time, it is important that the measured signal travel time be as accurate as possible. In such cases, a PCD may enter a wait state (Step 2040) until a response can be made. If responding after entering a wait state, the PCD 110 may transmit a second data packet with a third time stamp, which indicates the time of transmission of the packet (Step 2042).

If no wait state is required, the PCD 110 may respond immediately to the receipt of the first data packet by transmitting a second data packet (Step 2028). The second data packet may also include a time stamp indicating the time of receiving the first data packet.

Once the second data packet is received by the AP 120, the AP 120 may determine the bearing from which it was transmitted (Step 2030). Following the bearing determination the AP may then calculate the distance between the AP and the PCD based on the signal travel time (Step 2032). The signal travel time may be the time elapsed between the first time stamp and the second time stamp, or the time elapsed between the second and third time stamps. In some embodiments, a PCD may also calculate the distance to the AP upon receiving the first data packet based on the time elapsed between the first time stamp and the second time stamp.

Following the calculation of the distance between the PCD and the AP, the AP may then transmit the precise location information to both the network and the PCD (Step 2034).

Figure 15A:
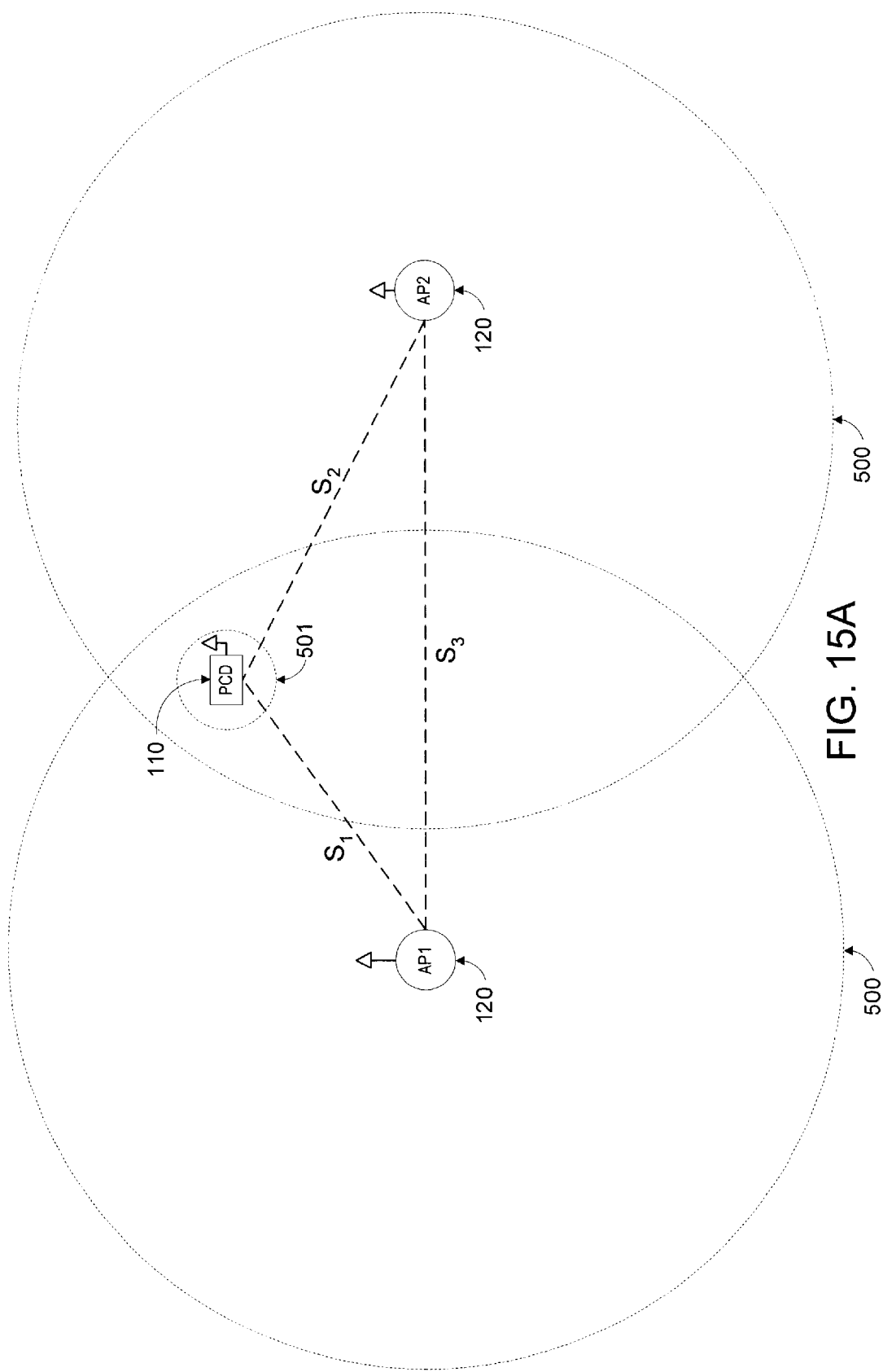
FIG. 15A is a diagram illustrating the use of two access points of one embodiment to determine the location of an MU using triangulation techniques.
Figure 15B:
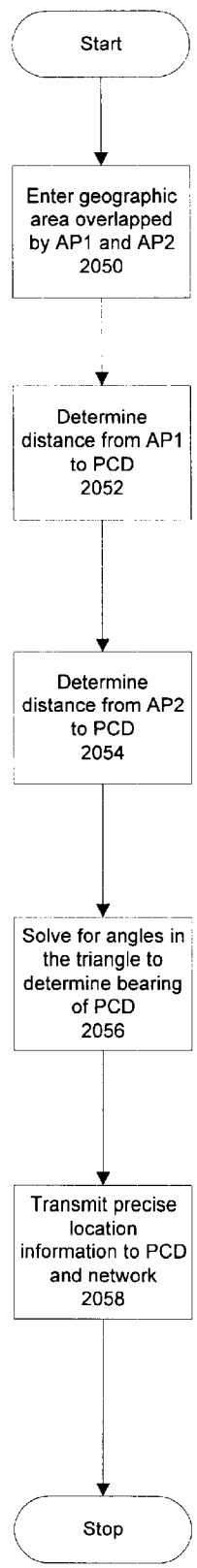
FIG. 15B is a flowchart illustrating the operation of two access points of one embodiment to determine the location of an MU using triangulation techniques.

FIGS. 15A and 15B: Determining Precise Location Using Triangulation

In some cases, it may not be possible for an AP to determine the bearing of an incoming signal. However, AP's may be configured to determine a precise location using triangulation techniques. FIG. 15A illustrates a scenario in which two AP's 120 may work in conjunction to determine the precise location of PCD 110. As shown in the drawing, the geographic regions 500 covered by AP1 and AP2 overlap with each other. PCD 110 is located in between the overlapping regions, and thus may communicate with either of the AP's 120. The distance between AP1 and AP2 is fixed, and is represented by side S3 of the triangle shown. In order to determine the length of the other two sides of the triangle, S1 and S2, each AP 120 may independently determine a distance to PCD 110. The distance between an AP 120 and PCD 110 may be determined using either the signal strength or the time stamp techniques as discussed above. The distance determinations from each AP yield a triangle with sides $S_1$, $S_2$, and $S_3$. Having determined the length of each side of the triangle, the law of cosines may then be used to determine the angle between sides $S_1$ and $S_2$. After determining the angle between $S_1$ and $S_2$, the other two angles, and hence the bearing relative to each AP, may be easily calculated using the law of cosines.

FIG. 15B is a flowchart of one embodiment of a method for determining bearing using triangulation. The method may begin when a mobile user carries a PCD into a geographic region covered by multiple AP's (Step 2050), such as that shown in FIG. 15A. The PCD may then establish a wireless connection with both AP's. AP1 and AP2 may then each independently determine the distance to the PCD (Steps 2052 and 2054). The method used to determine the distance to the PCD by each AP may involve either signal strength measurements or signal travel time calculations, as explained above with reference to FIGS. 14A and 14B. The distance determinations may be used to perform standard triangulation techniques. More specifically, the distance determinations may yield two sides of a triangle, with the third side of the triangle being the distance between the two AP's. With the three sides of the triangle determined, either of the (or both) AP's may determine the angles of the triangle (Step 2056). In one embodiment, an AP may use the law of cosines to make an initial angle determination, and then solve for the other two angles of the triangle. Determination of each angle in the triangle may yield bearing information, and thus precise location information. With the precise location determined, one or both AP's may transmit the precise location information to the network and the PCD (Step 2058).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A geographic-based communications service system, comprising:

a portable computing device, wherein said portable computing device is configured to communicate in a wireless manner;

a network;

a plurality of wireless access points coupled to said network and arranged at known geographic locations, wherein at least one of the plurality of access points is configured to communicate with the portable computing device in a wireless manner, wherein the at least one access point is operable to communicate with the portable computing device in a first geographic area of the first access point, wherein the at least one access point is further configured to determine a geographic location of the portable computing device in a second smaller geographic area within the first geographic area.

2. The geographic-based communications service system as recited in claim 1, wherein the at least one access point is operable to determine a relative geographic location of the portable computing device relative to the at least one access point;

wherein the at least one access point is operable to determine the geographic location of the portable computing device using the known geographic location of the at least one access point and the relative geographic location of the portable computing device relative to the at least one access point.

3. The geographic-based communications service system as recited in claim 1, wherein the at least one access point is operable to determine an approximate distance of the portable computing device relative to the at least one access point.

4. The geographic-based communications service system as recited in claim 1, wherein the at least one access point is operable to determine an approximate bearing of the portable computing device relative to the at least one access point.

5. The geographic-based communications service system as recited in claim 1, wherein the at least one access point is operable to determine an approximate bearing and distance of the portable computing device relative to the at least one access point.

6. The geographic-based communications service system as recited in claim 1, wherein the at least one access point is operable to determine a proximity of the portable computing device to one or more vendors using the geographic location of the portable computing device.

7. The geographic-based communications service system as recited in claim 1, wherein the at least one access point is operable to determine a vendor location of a plurality of possible vendor locations in which the portable computing device is located or proximate to.

8. The geographic-based communications service system as recited in claim 1, wherein the at least one access point is operable to provide information regarding the geographic location of the portable computing device to a service provider;
   wherein the service provider is operable to provide geographic-based services to a user of the portable computing device based on the information regarding the geographic location of the portable computing device.

9. The geographic-based communications service system as recited in claim 8, wherein the at least one access point is operable to determine a proximity of the portable computing device to one or more vendors using the geographic location of the portable computing device;
   wherein the information regarding the geographic location of the portable computing device includes information regarding the one or more vendors.

10. The geographic-based communications service system as recited in claim 8, wherein the at least one access point is operable to determine a first vendor location of a plurality of possible vendor locations in which the portable computing device is located or proximate to;
    wherein the information regarding the geographic location of the portable computing device includes information regarding the first vendor location.

11. The geographic-based communications service system as recited in claim 8, wherein the user of the portable computing device is physically located proximate to a first vendor;
    wherein the service provider is operable to provide information to the portable computing device, wherein the information corresponds to the first vendor.

12. The geographic-based communications service system as recited in claim 11, wherein the information comprises advertising of the first vendor.

13. The geographic-based communications service system as recited in claim
    wherein the user of the portable computing device is physically located at or proximate to a first vendor location of a first vendor;
    wherein the at least one access point is operable to determine the first vendor location of a plurality of possible vendor locations in which the portable computing device is located;
    wherein the service provider is operable to provide information to the portable computing device, wherein the information corresponds to the first vendor.

14. The geographic-based communications service system as recited in claim 1, wherein the at least one access point is operable to provide information regarding the geographic location of the portable computing device to a service provider;
    wherein the service provider is operable to determine a proximity of the at least one access point to one or more vendors using the geographic location of the portable computing device;
    wherein the service provider is operable to provide geographic-based services to a user of the portable computing device based on said determined proximity.

15. The geographic-based communications service system as recited in claim 1, wherein the geographic location of the portable computing device includes a latitude and longitude of the location of the portable computing device.

16. The geographic-based communications service system as recited in claim 1, further comprising a memory which stores map information of the first geographic area of the at least one access point;
    wherein a proximity of the portable computing device to a vendor is determined using the map information and the geographic location of the portable computing device.

17. The geographic-based communications service system as recited in claim 1, wherein the at least one access point includes location circuitry;
    wherein the location circuitry is operable to determine the geographic location of the portable computing device in the second smaller geographic area within the first geographic area.

18. The geographic-based communications service system as recited in claim 1, wherein the at least one access point is operable to determine the geographic location of the portable computing device using at least one of: signal strength of a signal from the portable computing device, time stamps of data packets transmitted between the portable computing device and the at least one access point, and triangulation techniques.

19. The geographic-based communications service system as recited in claim 1, wherein the at least one access point is configured to measure the signal strength of a signal received from said portable computing device, wherein said signal strength is useable in determining a distance from the at least one access point to the portable computing device, wherein said signal strength is used in determining the geographic location of the portable computing device.

20. The geographic-based communications service system as recited in claim 1, wherein one or more of the at least one access point and the portable computing device is configured to transmit and receive data packets, wherein each of said data packets includes a time stamp;
    wherein one or more of the at least one access point and the portable computing device is configured to determine a distance between the at least one access point and the portable computing device based on at least a first time stamp and a second time stamp, wherein said first time stamp is included in a data packet transmitted by the at least one access point and said second time stamp is included in a data packet transmitted by the portable computing device.

21. The geographic-based communications service system as recited in claim 1, wherein said plurality of access points includes a first access point and a second access point, wherein said first access point and said access point are configured to determine the geographic location of said portable computing device using triangulation techniques.

22. The geographic-based communications service system as recited in claim 1, wherein each of said plurality of access points is configured for detecting said portable computing device responsive to said portable computing device entering said first geographic area.

23. The geographic-based communications service system as recited in claim 1, wherein the at least one access point is configured to transmit the geographic location of said portable computing device to a memory associated with said portable computing device, thereby advising said portable computing device of its location.

24. The geographic-based communications service system as recited in claim 1, wherein the at least one access point is configured to provide directions to a specified location responsive to a query from said portable computing device, said directions to said specified location based at least in part upon the geographic location of said portable computing device.

25. The geographic-based communications service system as recited in claim 1, wherein the at least one access point is configured to determine a direction of motion of said portable computing device based on two or more determinations of the geographic location of said portable computing device.

26. The geographic-based communications service system as recited in claim 1, wherein the at least one access point is configured to transmit information to said portable computing device, wherein said information is dependent upon the geographic location of said portable computing device.

27. The geographic-based communications service system as recited in claim 1, wherein the at least one access point is configured to transmit information to said portable computing device, wherein said information is dependent upon the geographic location of said portable computing device and demographic information of the user of said portable computing device.

28. The geographic-based communications service system as recited in claim 1, wherein a perimeter of said second smaller geographic area is within 10 feet of said portable computing device.

29. The geographic-based communications service system as recited in claim 1, wherein a perimeter of said second smaller geographic area is within 5 feet of said portable computing device.

30. The geographic-based communications service system as recited in claim 1, wherein said second smaller geographic area comprises a concentric ring region centered around the at least one access point.

31. The geographic-based communications service system as recited in claim 1, wherein the geographic location of the portable computing device is useable to determine a proximity of the portable computing device to a vendor;
wherein targeted advertising of the vendor is provided to the portable computing device in response to the proximity of the portable computing device to the vendor.

32. A geographic-based communications service system, comprising:
a portable computing device, wherein said portable computing device is configured to communicate in a wireless manner;
a network;
a plurality of wireless access points coupled to said network and arranged at known geographic locations, wherein at least one of the plurality of access points is configured to communicate with the portable computing device in a wireless manner, wherein the at least one access point is further configured to determine a relative geographic location of the portable computing device relative to the known geographic location of the at least one access point, wherein the at least one of the plurality of access points is configured to communicate with the portable computing device in a wireless manner in a first geographic area of the at least one access point, wherein the at least one access point is further configured to determine the geographic location of the portable computing device in a second smaller geographic area within the first geographic area.

33. The geographic-based communications service system as recited in claim 32, wherein the at least one access point is operable to determine the geographic location of the portable computing device using the known geographic location of the at least one access point and the relative geographic location of the portable computing device relative to the known geographic location of the at least one access point.

34. The geographic-based communications service system as recited in claim 32, wherein the at least one access point is operable to determine an approximate distance of the portable computing device relative to the at least one access point.

35. The geographic-based communications service system as recited in claim 32, wherein the at least one access point is operable to determine an approximate bearing of the portable computing device relative to the at least one access point.

36. The geographic-based communications service system as recited in claim 32, wherein the at least one access point is operable to determine an approximate bearing and distance of the portable computing device relative to the at least one access point.

37. The geographic-based communications service system as recited in claim 32, wherein the at least one access point is operable to determine a proximity of the portable computing device to one or more vendors using the geographic location of the portable computing device.

38. The geographic-based communications service system as recited in claim 32, wherein the at least one access point is operable to determine a vendor location of a plurality of possible vendor locations in which the portable computing device is located or proximate to.

39. The geographic-based communications service system as recited in claim 32, wherein the at least one access point is operable to provide information regarding the geographic location of the portable computing device to a service provider;
wherein the service provider is operable to provide geographic-based services to a user of the portable computing device based on the information regarding the geographic location of the portable computing device.

40. The geographic-based communications service system as recited in claim 39, wherein the at least one access point is operable to determine a proximity of the portable computing device to one or more vendors using the geographic location of the portable computing device;
  wherein the information regarding the geographic location of the portable computing device includes information regarding the one or more vendors.

41. The geographic-based communications service system as recited in claim 39, wherein the at least one access point is operable to determine a first vendor location of a plurality of possible vendor locations in which the portable computing device is located or proximate to;
  wherein the information regarding the geographic location of the portable computing device includes information regarding the first vendor location.

42. The geographic-based communications service system as recited in claim 39, wherein the user of the portable computing device is physically located proximate to a first vendor;
  wherein the service provider is operable to provide information to the portable computing device, wherein the information corresponds to the first vendor.

43. The geographic-based communications service system as recited in claim 42, wherein the information comprises advertising of the first vendor.

44. The geographic-based communications service system as recited in claim 39,
  wherein the user of the portable computing device is physically located at or proximate to a first vendor location of a first vendor;
  wherein the at least one access point is operable to determine the first vendor location of a plurality of possible vendor locations in which the portable computing device is located;
  wherein the service provider is operable to provide information to the portable computing device, wherein the information corresponds to the first vendor.

45. The geographic-based communications service system as recited in claim 32, wherein the at least one access point stores map information of the first geographic area of the at least one access point,
  wherein the at least one access point is operable to determine the proximity of the portable computing device to a vendor using the map information and the geographic location of the portable computing device.

46. The geographic-based communications service system as recited in claim 32, wherein the at least one access point is operable to determine the geographic location of the portable computing device using at least one of: signal strength of a signal from the portable computing device, time stamps of data packets transmitted between the portable computing device and the at least one access point, and triangulation techniques.

47. A method for providing a geographic-based communications service in a network system, wherein the network system includes a plurality of wireless access points coupled to a network and arranged at known geographic locations, the method comprising:
  a portable computing device communicating in a wireless manner with a first access point, wherein the first access point is operable to communicate with the portable computing device in a first geographic area of the first access point; and
  determining a geographic location of the portable computing device in a second smaller geographic area within the first geographic area.

48. The method as recited in claim 47, wherein the first access point determines the geographic location of the portable computing device.

49. The method as recited in claim 47, wherein said determining includes determining an approximate distance of the portable computing device relative to the first access point.

50. The method as recited in claim 47, wherein said determining includes determining an approximate bearing of the portable computing device relative to the first access point.

51. The method as recited in claim 47, wherein said determining includes determining an approximate bearing and distance of the portable computing device relative to the first access point.

52. The method as recited in claim 47,
  wherein said determining includes:
    determining a relative geographic location of the portable computing device relative to the first access point; and
    determining the geographic location of the portable computing device using the known geographic location of the first access point and the relative geographic location of the portable computing device relative to the first access point.

53. The method as recited in claim 47, further comprising:
  providing geographic-based services to a user of the portable computing device based on information regarding the geographic location of the portable computing device.

54. The method as recited in claim 53, further comprising:
  determining a proximity of the portable computing device to one or more vendors using the geographic location of the portable computing device;
  wherein the information regarding the geographic location of the portable computing device includes information regarding the one or more vendors.

55. The method as recited in claim 53, further comprising:
  determining a first vendor location of a plurality of possible vendor locations in which the portable computing device is located or proximate to;
  wherein the information regarding the geographic location of the portable computing device includes information regarding the first vendor location.

56. The method as recited in claim 53, wherein the user of the portable computing device is physically located proximate to a first vendor;
  wherein said providing provides information to the portable computing device, wherein the information corresponds to the first vendor.

57. The method as recited in claim 56, wherein the information comprises advertising of the first vendor.

58. The method as recited in claim 53,
  wherein the user of the portable computing device is physically located at or proximate to a first vendor location of a first vendor; the method further comprising:
    determining the first vendor location of a plurality of possible vendor locations in which the portable computing device is located;
    wherein said providing geographic-based services comprises providing information to the portable computing device, wherein the information corresponds to the first vendor.

59. The method as recited in claim 47, wherein the geographic location of the portable computing device includes a latitude and longitude of the location of the portable computing device.

60. The method as recited in claim 47, further comprising:
determining a proximity of the portable computing device to one or more vendors, wherein said determining a proximity uses the geographic location of the portable computing device.

61. The method as recited in claim 60, wherein the first access point determines the proximity of the portable computing device to one or more vendors.

62. The method as recited in claim 60,
wherein said determining the proximity of the portable computing device to one or more vendors includes using map information of the first geographic area of the at least one access point and the geographic location of the portable computing device.

63. The method as recited in claim 47,
wherein said determining a geographic location of the portable computing device includes using at least one of: signal strength of a signal from the portable computing device, time stamps of data packets transmitted between the portable computing device and the at least one access point, and triangulation techniques.

64. The method as recited in claim 47, further comprising:
transmitting the geographic location of the portable computing device to a memory associated with said portable computing device, thereby advising the portable computing device of its location.

65. The method as recited in claim 47, further comprising:
receiving a query from the portable computing device regarding directions to a specified location; and
providing the directions to the specified location, wherein the directions to the specified location are based at least in part upon the geographic location of the portable computing device.

66. he method as recited in claim 47, further comprising:
performing two or more determinations of the geographic location of the portable computing device; and
determining a direction of motion of the portable computing device based on the two or more determinations of the geographic location of the portable computing device.

67. The method as recited in claim 47, further comprising:
providing information to the portable computing device, wherein said information is dependent upon the geographic location of said portable computing device.

68. The method as recited in claim 47, further comprising:
providing information to the portable computing device, wherein said information is dependent upon the geographic location of said portable computing device and demographic information of the user of said portable computing device.

69. The method as recited in claim 47, wherein a perimeter of said second smaller geographic area is within 10 feet of said portable computing device.

70. The method as recited in claim 47, wherein a perimeter of said second smaller geographic area is within 5 feet of said portable computing device.

71. The method as recited in claim 47, wherein said second smaller geographic area comprises a concentric ring region centered around the first access point.

72. The method as recited in claim 47, further comprising:
determining a proximity of the portable computing device to a vendor using the geographic location of the portable computing device;
providing targeted advertising of the vendor to the portable computing device in response to determining the proximity of the portable computing device to the vendor.

73. A shopping mall-based geographic-based communications service system, comprising:
a portable computing device, wherein said portable computing device is configured to communicate in a wireless manner;
a network;
a plurality of wireless access points coupled to said network and arranged at known geographic locations in the shopping mall, wherein at least one of the plurality of access points is configured to communicate with the portable computing device in a wireless manner, wherein the at least one access point is operable to communicate with the portable computing device in a first geographic area of the first access point, wherein the at least one access point is further configured to determine a geographic location of the portable computing device in a second smaller geographic area within the first geographic area;
wherein a proximity of the portable computing device to one or more vendors in the shopping mall is operable to be determined using the geographic location of the portable computing device.

74. The shopping mall-based geographic-based communications service system as recited in claim 73, wherein the at least one access point is operable to determine a relative geographic location of the portable computing device relative to the at least one access point;
wherein the at least one access point is operable to determine the geographic location of the portable computing device using the known geographic location of the at least one access point and the relative geographic location of the portable computing device relative to the at least one access point.

75. The shopping mall-based geographic-based communications service system as recited in claim 73, wherein the at least one access point is operable to determine an approximate distance of the portable computing device relative to the at least one access point.

76. The shopping mall-based geographic-based communications service system as recited in claim 73, wherein the at least one access point is operable to determine an approximate bearing of the portable computing device relative to the at least one access point.

77. The shopping mall-based geographic-based communications service system as recited in claim 73, wherein the at least one access point is operable to determine an approximate bearing and distance of the portable computing device relative to the at least one access point.

78. The shopping mall-based geographic-based communications service system as recited in claim 73, wherein the at least one access point is operable to determine a proximity of the portable computing device to one or more vendors using the geographic location of the portable computing device.

79. The shopping mall-based geographic-based communications service system as recited in claim 73, wherein a vendor location of a plurality of possible vendor locations in which the portable computing device is located or proximate to is operable to be determined.

80. The shopping mall-based geographic-based communications service system as recited in claim 73, wherein the at least one access point is operable to provide information regarding the geographic location of the portable computing device to a service provider;
wherein the service provider is operable to provide geographic-based services to a user of the portable computing device based on the information regarding the geographic location of the portable computing device.

81. The shopping mall-based geographic-based communications service system as recited in claim 80, wherein the at least one access point is operable to determine a proximity of the portable computing device to one or more vendors using the geographic location of the portable computing device;
   wherein the information regarding the geographic location of the portable computing device includes information regarding the one or more vendors.

82. The shopping mall-based geographic-based communications service system as recited in claim 80, wherein the at least one access point is operable to determine a first vendor location of a plurality of possible vendor locations in which the portable computing device is located or proximate to;
   wherein the information regarding the geographic location of the portable computing device includes information regarding the first vendor location.

83. The shopping mall-based geographic-based communications service system as recited in claim 80, wherein the user of the portable computing device is physically located proximate to a first vendor;
   wherein the service provider is operable to provide information to the portable computing device, wherein the information corresponds to the first vendor.

84. The shopping mall-based geographic-based communications service system as recited in claim 83, wherein the information comprises advertising of the first vendor.

85. The shopping mall-based geographic-based communications service system as recited in claim 80,
   wherein the user of the portable computing device is physically located at or proximate to a first vendor location of a first vendor;
   wherein the at least one access point is operable to determine the first vendor location of a plurality of possible vendor locations in which the portable computing device is located;
   wherein the service provider is operable to provide information to the portable computing device, wherein the information corresponds to the first vendor.

86. The shopping mall-based geographic-based communications service system as recited in claim 73, wherein the at least one access point is operable to provide information regarding the geographic location of the portable computing device to a service provider;
   wherein the service provider is operable to determine a proximity of the at least one access point to one or more vendors using the geographic location of the portable computing device;
   wherein the service provider is operable to provide geographic-based services to a user of the portable computing device based on said determined proximity.

87. The shopping mall-based geographic-based communications service system as recited in claim 73, wherein the geographic location of the portable computing device includes a latitude and longitude of the location of the portable computing device.

88. The shopping mall-based geographic-based communications service system as recited in claim 73, further comprising a memory which stores map information of the first geographic area of the at least one access point;
   wherein a proximity of the portable computing device to a vendor is determined using the map information and the geographic location of the portable computing device.

89. The shopping mall-based geographic-based communications service system as recited in claim 73, wherein the at least one access point includes location circuitry;
   wherein the location circuitry is operable to determine the geographic location of the portable computing device in the second smaller geographic area within the first geographic area.

90. The shopping mall-based geographic-based communications service system as recited in claim 73, wherein the at least one access point is operable to determine the geographic location of the portable computing device using at least one of: signal strength of a signal from the portable computing device, time stamps of data packets transmitted between the portable computing device and the at least one access point, and triangulation techniques.

91. The shopping mall-based geographic-based communications service system as recited in claim 73, herein the at least one access point is configured to measure the signal strength of a signal received from said portable computing device, wherein said signal strength is useable in determining a distance from the at least one access point to the portable computing device, wherein said signal strength is used in determining the geographic location of the portable computing device.

92. The shopping mall-based geographic-based communications service system as recited in claim 73, wherein one or more of the at least one access point and the portable computing device is configured to transmit and receive data packets, wherein each of said data packets includes a time stamp;
   wherein one or more of the at least one access point and the portable computing device is configured to determine a distance between the at least one access point and the portable computing device based on at least a first time stamp and a second time stamp, wherein said first time stamp is included in a data packet transmitted by the at least one access point and said second time stamp is included in a data packet transmitted by the portable computing device.

93. The shopping mall-based geographic-based communications service system as recited in claim 73, wherein said plurality of access points includes a first access point and a second access point, wherein said first access point and said access point are configured to determine the geographic location of said portable computing device using triangulation techniques.

94. The shopping mall-based geographic-based communications service system as recited in claim 73, wherein each of said plurality of access points is configured for detecting said portable computing device responsive to said portable computing device entering said first geographic area.

95. The shopping mall-based geographic-based communications service system as recited in claim 73, wherein the at least one access point is configured to transmit the geographic location of said portable computing device to a memory associated with said portable computing device, thereby advising said portable computing device of its location.

96. The shopping mall-based geographic-based communications service system as recited in claim 73, wherein the at least one access point is configured to provide directions to a specified location responsive to a query from said portable computing device, said directions to said specified location based at least in part upon the geographic location of said portable computing device.

97. The shopping mall-based geographic-based communications service system as recited in claim 73, wherein the at least one access point is configured to determine a direction of motion of said portable computing device based on two or more determinations of the geographic location of said portable computing device.

98. The shopping mall-based geographic-based communications service system as recited in claim 73, wherein the at least one access point is configured to transmit information to said portable computing device, wherein said information is dependent upon the geographic location of said portable computing device.

99. The shopping mall-based geographic-based communications service system as recited in claim 73, wherein the at least one access point is configured to transmit information to said portable computing device, wherein said information is dependent upon the geographic location of said portable computing device and demographic information of the user of said portable computing device.

100. The shopping mall-based geographic-based communications service system as recited in claim 73, wherein a perimeter of said second smaller geographic area is within 10 feet of said portable computing device.

101. The shopping mall-based geographic-based communications service system as recited in claim 73, wherein a perimeter of said second smaller geographic area is within 5 feet of said portable computing device.

102. The shopping mall-based geographic-based communications service system as recited in claim 73, wherein said second smaller geographic area comprises a concentric ring region centered around the at least one access point.

103. The shopping mall-based geographic-based communications service system as recited in claim 73, wherein the geographic location of the portable computing device is useable to determine a proximity of the portable computing device to a vendor;

wherein advertising of the vendor is provided to the portable computing device in response to the proximity of the portable computing device to the vendor.

104. The shopping mall-based geographic-based communications service system as recited in claim 73, wherein the geographic location of the portable computing device is useable to determine a proximity of the portable computing device to a vendor;

wherein the access point is operable to provide advertising of the vendor to the portable computing device in response to the proximity of the portable computing device to the vendor.

105. The shopping mall-based geographic-based communications service system as recited in claim 73, wherein said portable computing device is configured to communicate using wireless Ethernet;

wherein the at least one of the plurality of access points is configured to communicate with the portable computing device using wireless Ethernet.

106. A shopping mall-based geographic-based communications service system, comprising:

a portable computing device, wherein said portable computing device is configured to communicate in a wireless manner;

a network;

a plurality of wireless access points coupled to said network and arranged at known geographic locations in the shopping mall, wherein at least one of the plurality of access points is configured to communicate with the portable computing device in a wireless manner, wherein the at least one access point is operable to communicate with the portable computing device in a first geographic area of the first access point, wherein the at least one access point is further configured to determine a geographic location of the portable computing device in a second smaller geographic area within the first geographic area.

107. An airport-based geographic-based communications service system, comprising:

a portable computing device, wherein said portable computing device is configured to communicate in a wireless manner;

a network;

a plurality of wireless access points coupled to said network and arranged at known geographic locations in the airport, wherein at least one of the plurality of access points is configured to communicate with the portable computing device in a wireless manner, wherein the at least one access point is operable to communicate with the portable computing device in a first geographic area of the first access point, wherein the at least one access point is further configured to determine a geographic location of the portable computing device in a second smaller geographic area within the first geographic area.

108. A geographic-based communications service system, comprising:

a portable computing device, wherein said portable computing device is configured to communicate in a wireless manner;

a network;

a plurality of wireless access points coupled to said network and arranged at known geographic locations in a mass-transit station, wherein at least one of the plurality of access points is configured to communicate with the portable computing device in a wireless manner, wherein the at least one access point is operable to communicate with the portable computing device in a first geographic area of the first access point, wherein the at least one access point is further configured to determine a geographic location of the portable computing device in a second smaller geographic area within the first geographic area.

109. A geographic-based communications service system, comprising:

a portable computing device, wherein said portable computing device is configured to communicate in a wireless manner;

a network;

a plurality of wireless access points coupled to said network and arranged at known geographic locations, wherein at least one of the plurality of access points is configured to communicate with the portable computing device in a wireless manner using wireless Ethernet, wherein the at least one access point is operable to communicate with the portable computing device in a first geographic area of the first access point using wireless Ethernet, wherein the at least one access point is further configured to determine a geographic location of the portable computing device in a second smaller geographic area within the first geographic area.

* * * * *

UNITED STATES PATENT AND TRADEMARK OFFICE
CERTIFICATE OF CORRECTION

PATENT NO.   : 6,414,635 B1
DATED        : July 2, 2002
INVENTOR(S)  : Brett B. Stewart and James W. Thompson It is certified that error appears in the above-identified patent and that said Letters Patent is hereby corrected as shown below:

Column 34,
Line 2, please insert the number -- 8 -- after the word "claim".

Column 39,
Line 33, please delete "he" and insert the word -- The -- at the beginning of the sentence.

Signed and Sealed this

Third Day of December, 2002

JAMES E. ROGAN
*Director of the United States Patent and Trademark Office*